United States Patent
Graves

(10) Patent No.: US 11,876,269 B2
(45) Date of Patent: Jan. 16, 2024

(54) PASSIVE FLOW BATTERY

(71) Applicant: Christopher Ronald Graves, Palo Alto, CA (US)

(72) Inventor: Christopher Ronald Graves, Palo Alto, CA (US)

(73) Assignee: Noon Energy, Palo Alto, CA (US)

( * ) Notice: Subject to any disclaimer, the term of this patent is extended or adjusted under 35 U.S.C. 154(b) by 853 days.

(21) Appl. No.: 16/962,701

(22) PCT Filed: Jan. 17, 2019

(86) PCT No.: PCT/EP2019/051142
§ 371 (c)(1),
(2) Date: Jul. 16, 2020

(87) PCT Pub. No.: WO2019/141773
PCT Pub. Date: Jul. 25, 2019

(65) Prior Publication Data
US 2020/0358123 A1 Nov. 12, 2020

(30) Foreign Application Priority Data

Jan. 19, 2018 (EP) .................................... 18152454

(51) Int. Cl.
*H01M 8/00* (2016.01)
*H01M 8/18* (2006.01)
(Continued)

(52) U.S. Cl.
CPC ....... *H01M 8/186* (2013.01); *H01M 8/04216* (2013.01); *H01M 8/0656* (2013.01);
(Continued)

(58) Field of Classification Search
CPC ............. H01M 8/186; H01M 8/04216; H01M 2008/1293; H01M 8/0668; H01M 8/0656
See application file for complete search history.

(56) References Cited

U.S. PATENT DOCUMENTS

| 8,637,197 B2 | 1/2014 | Braun et al. |
| 9,236,627 B1 | 1/2016 | Huang et al. |

(Continued)

FOREIGN PATENT DOCUMENTS

| WO | 1996/23322 A1 | 8/1996 |
| WO | 2014/044285 A1 | 3/2014 |

*Primary Examiner* — Cynthia H Kelly
*Assistant Examiner* — Monique M Wills
(74) *Attorney, Agent, or Firm* — SQUIRE PATTON BOGGS (US)

(57) ABSTRACT

The invention relates to a rechargeable battery system 1, comprising: at least one electrochemical cell 2 adapted for in charge mode to convert one or more gaseous electrochemical reaction reactant(s) 3 into one or more gaseous electrochemical reaction product(s) 4, at least one storage arrangement 5 for storing said gaseous electrochemical reaction reactants and products, wherein at least one of the gaseous electrochemical reaction product(s) 4 is converted to and stored as at least one chemical reaction product(s) 7,11, where said chemical reaction product(s) 7,11 has a lower gas pressure upon formation than the corresponding gaseous electrochemical reaction product(s) 4, a first fluid communication system 12 between the at least one cell and the at least one storage arrangement 5, wherein the first fluid communication system is configured to form a closed system within the battery system, whereby the battery system is adapted to generate an automatic gas flow between the at least one storage arrangement 5 and cell 2.

20 Claims, 9 Drawing Sheets

(51) Int. Cl.
  *H01M 8/04082*   (2016.01)
  *H01M 8/0656*    (2016.01)
  *H01M 8/0668*    (2016.01)
  *H01M 8/12*      (2016.01)
  *H01M 8/14*      (2006.01)

(52) U.S. Cl.
  CPC .. *H01M 8/0668* (2013.01); *H01M 2008/1293* (2013.01); *H01M 2008/147* (2013.01)

(56) References Cited

U.S. PATENT DOCUMENTS

| | | |
|---|---|---|
| 2004/0191595 A1 | 9/2004 | McElroy et al. |
| 2009/0148731 A1* | 6/2009 | Mills ................ H01M 8/04216 429/421 |
| 2009/0233155 A1* | 9/2009 | Littau .................... B01D 53/62 429/344 |
| 2011/0223450 A1* | 9/2011 | Horne .................... B60L 53/30 429/72 |
| 2012/0282534 A1 | 11/2012 | Braun et al. |
| 2013/0112569 A1 | 5/2013 | Ise et al. |
| 2014/0234735 A1 | 8/2014 | Zhang et al. |

* cited by examiner

PASSIVE FLOW BATTERY

FIELD OF INVENTION

The present invention relates to an electrochemical device, such as a rechargeable battery system, use of said system for operation in charging and discharging mode, such as use of the system as a flow battery and/or reversible fuel cell, as well as methods for charging and discharging a battery system.

BACKGROUND OF INVENTION

Rechargeable batteries are electrochemical devices, which may be operated in two modes, respectively charging mode and discharging mode. In charging mode, the battery is being charged by using it to store electricity supplied from an external circuit. In discharging mode, the battery is being discharged by using it to provide electricity to an external circuit. Thus, a rechargeable battery is inherently suitable for being operated in both charging and discharging modes, and the operational mode only depends on the direction of the current to the battery, i.e. the current being either supplied to the battery (charging), or provided by the battery (discharging).

Rechargeable batteries operate by electrochemical reactions. During charging, electrochemical reaction reactants within the battery are, by the supply of current from the external circuit, electrochemically converted into electrochemical reaction products. During discharging, the opposite electrochemical reaction occurs, thus regenerating the charge-mode electrochemical reactants from the charge-mode electrochemical products, and providing current to an external circuit.

Rechargeable batteries are commonly used to power portable or mobile electric devices such as computers, phones, tools, and vehicles. However, recently the batteries are also being used for storing surplus electricity produced by discontinuous and renewable energy sources like solar and wind power.

Different types of rechargeable batteries are known, and the main types include: Li-ion batteries, flow batteries, and reversible fuel cells.

For Li-ion batteries, the chemical reactants and products are stored within the electrodes of the battery. Thus, the properties of the Li-based reactants and products limit the storage capacity and energy density of the battery.

Flow Batteries

For flow batteries, the chemical reactants and products are fluids which are stored outside the cell and fed by pumps into the cell to store electricity or generate electricity. Thus, the storage capacity and energy density depend on the size of the storage tank or container. The fluids are typically electrolyte solutions and energy is stored in dissolved ionic species, for example in vanadium ions of different oxidation states in vanadium redox flow batteries.

In reversible fuel cells, also known as regenerative fuel cells, in energy storage mode the chemical reactants are continuously supplied from an external source to the cell, and the products (e.g. fuel gasses) are extracted to a storage outside the system. The reactants and products are charge-neutral species, such as water as reactant and hydrogen and oxygen as products in energy storage mode. A reversible fuel cell that is operated as a closed system may be considered as a type of flow battery. The storage tanks can also be open for continuous flow to an external source or storage, i.e. corresponding to a flow battery with infinite capacity.

A major disadvantage for flow batteries and reversible fuel cells is the need for voluminous tanks or containers to store reactants and/or products, making their energy density low. A further drawback is the need for flow controlling means ensuring the essential flow of fluid and/or gaseous reactants and products to and from the cell. The flow controlling means, also known as balance-of-system components, may include a number of compressors, expanders, condensers, and pumps. In addition to increasing the complexity of the system, the flow controlling means are expensive and typically dominate the system cost of a flow battery. The flow controlling means also consume energy, decreasing the efficiency of the flow battery and increasing the energy storage cost.

Carbon-Oxygen Flow Battery

WO 2014/044285 [1] describes a carbon-oxygen flow battery based on a reversible fuel cell preferably of the type reversible solid oxide electrochemical cell, where the gaseous electrochemical reaction reactant $CO_2$ is electrochemically converted into electrochemical reaction products of solid carbon and gaseous oxygen in charge mode. The charging reaction can occur by a two-step reaction: (1) followed by (2) as shown below:

$$2CO_2 + \text{electricity} + \text{heat} \rightarrow 2CO + O_2, \quad (1)$$

followed by $$2CO \rightarrow C + CO_2 + \text{heat} \quad (2)$$

The reverse, or opposite, reactions occur in the discharge mode. The second step (2) is also known as the Boudouard reaction, and results in the formation of carbon particles, which are deposited either in the electrode or in a region adjacent to the electrode or cell.

Thus, the electrochemical reaction reactant ($CO_2$) is electrochemically converted into a product of solid carbon, and thus the main electrical energy is stored within the solid carbon. The storage of electricity in the form of solid carbon results in a maximum theoretical efficiency of approximately 100% based on thermodynamics, independent of operating temperature. Furthermore, the solid carbon may be stored with high energy density directly within the electrochemical device, thereby avoiding a storage container outside the cell.

However, the carbon-oxygen flow battery described in [1] still requires voluminous tanks or containers to store other reactants ($CO_2$ and $O_2$), as well as flow controlling means to control their flow to/from the external tanks and to the cell.

Iron-Oxygen Flow Battery

WO/1996/023322 [2] describes an iron-oxygen flow battery that works by a similar principle. The iron-oxygen battery is based on a reversible fuel cell, either with solid oxide electrolyte or molten carbonate electrolyte, where the electrochemical reactant iron oxide is electrochemically converted into electrochemical products of solid iron metal and gaseous oxygen in charge mode. The charging reaction can occur directly in a single step, or by a two-step reaction: (3) followed by (4) as shown below:

$$2H_2O + \text{electricity} + \text{heat} \rightarrow 2H_2 + O_2, \quad (3)$$

followed by $$2H_2 + 2FeO \rightarrow 2Fe + 2H_2O \quad (4)$$

Iron is a low cost and high energy density storage medium. However, the net reaction is strongly exothermic and endothermic in discharge mode and charge mode, respectively. Therefore to achieve high energy storage efficiency, heat must be supplied to the battery during charge mode, either from an external source or from a heat storage component that has been previously charged during exothermic discharge mode. Furthermore, the iron-oxygen flow battery of [2] describes that the oxygen or air is supplied to the positive electrode by actively flowing air using flow controlling means.

Methane-Oxygen Flow Battery

U.S. Pat. No. 8,637,197 [3] describes a methane-oxygen flow system for electrical energy storage based on a reversible fuel cell of the type reversible solid oxide electrochemical cell, where the electrochemical reactants of $CO_2$ and $H_2O$ are electrochemically converted into electrochemical products of primarily methane, hydrogen and gaseous oxygen in charge mode. All reactants and products are gaseous and are stored as gasses, with the exception of $H_2O$ which may be stored as liquid water. The net reaction may occur in one or more steps. Although the reactants and products are very low cost chemicals, the system requires a large set of balance-of-system components including flow and pressure controlling means.

Despite the recent advances, there is a need for flow batteries with improved energy density and energy efficiency, as well as decreased system complexity, and lower costs.

SUMMARY OF INVENTION

The present disclosure provides a rechargeable battery of the type flow battery with improved energy density, energy efficiency, and lower system complexity and costs. Furthermore, the invention provides a self-contained flow battery, where the need for balance-of-system components is reduced and/or eliminated. Thus, the invention provides a passive flow battery, whereby the term "passive flow battery" is meant a flow battery where flow controlling means are not needed, and optionally no balance-of-system components are needed.

A first aspect of the disclosure relates to a rechargeable battery system 1, comprising:
  at least one electrochemical cell 2 adapted for in charge mode to convert one or more gaseous electrochemical reaction reactant(s) 3 into one or more gaseous electrochemical reaction product(s) 4,
  at least one storage arrangement 5 for storing said gaseous electrochemical reaction reactants and products,
  wherein at least one of the gaseous electrochemical reaction product(s) 4 is converted and stored as at least one chemical reaction product(s) 7,11, where said chemical reaction product(s) 7,11 has a lower gas pressure upon formation than the corresponding gaseous electrochemical reaction product(s) 4,
  a first fluid communication system 12 between the at least one cell and the at least one storage arrangement 5,
  wherein the first fluid communication system is configured to form a closed system within the battery system, whereby the battery system is adapted to generate an automatic gas flow between the at least one storage arrangement 5 and cell 2.

In a preferred embodiment, the storage arrangement is configured for storing at least one of the gaseous electrochemical reaction products, in a solid and/or liquid form, optionally obtained by chemical reaction with one or more further material(s).

In a further preferred embodiment, the at least one chemical reaction product(s) is in a solid and/or liquid form, whereby a lower gas pressure than the corresponding gaseous electrochemical reaction product(s) is obtained.

A second aspect of the disclosure relates to the use of the system according to the first aspect for operation in discharge mode.

A third aspect of the disclosure relates to the use of the system according to the first aspect as a flow battery and/or a reversible fuel cell.

A fourth aspect of the disclosure relates to a method for charging a rechargeable battery, comprising the steps of:
  providing the battery system according to the first aspect,
  providing an external electric current, optionally from a renewable power source such as wind, water, and/or solar,
  whereby the current is electrochemically converted to stored chemical energy within the battery.

A fifth aspect of the disclosure relates to a method for discharging a rechargeable battery, comprising the steps of:
  providing the battery system according to the first aspect,
  electrically connecting the battery system to an external electric circuit,
  whereby the chemical energy in the stored products of the battery system is electrochemically converted to an electric current.

A sixth aspect of the disclosure relates to a method for discharging a rechargeable battery, comprising the steps of:
  providing the battery system according to the first aspect, wherein the system is optionally fully discharged,
  supplying the system with a flow of fuel reactant(s), selected from the group of: hydrocarbons, alcohols, hydrogen, ammonia, and any combinations thereof,
  whereby the chemical energy in the fuel is electrochemically converted to an electric current.

DESCRIPTION OF DRAWINGS

The disclosure will in the following be described in greater detail with reference to the accompanying drawings.

Figure 1:
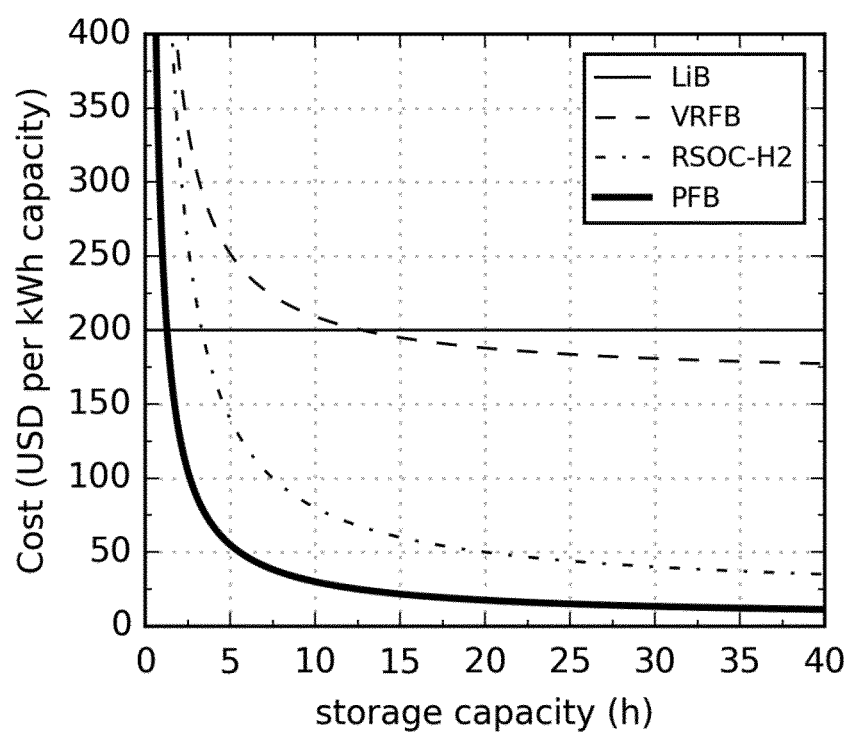
FIG. 1 shows the estimated cost of the storage capacity ($/kWh) as a function of the storage capacity in hours, or energy to power ratio (hours), for different battery technologies, where LiB=Lithium ion battery, VRFB=Vanadium redox flow battery, RSOC-$H_2$=Reversible solid oxide cell system that electrolyzes steam to hydrogen and oxygen during charge mode, and PFB=a passive flow battery according to the present invention with the carbon chemistry, i.e. corresponding to the embodiment shown in FIG. 3. The input values of energy capacity cost, power capacity cost, and roundtrip energy storage efficiency are taken from recent literature and for all technologies large scale mass production is assumed.

(A) shows an embodiment, where the storage arrangement 5 comprises gaseous electrochemical reaction reactants 6 (e.g. $CO_2$), gaseseous electrochemical reaction products 7 (e.g. CO) and solid or liquid chemical reaction products 11 (e.g. solid carbon). Examples of the embodiment include the carbon-oxygen flow battery, which is further described in Examples 1-3, and the sulfur-oxygen flow battery further described in Example 4.

(B) shows an embodiment, where the storage arrangement 5 comprises solid or liquid chemical reaction reactants 10 (e.g. FeO), gaseous electrochemical reaction products 7 (e.g. $O_2$), and solid or liquid chemical reaction products 11 (e.g. Fe). An example of the embodiment is the iron-oxygen flow battery further described in Example 5.

(C) shows an embodiment, where the storage arrangement 5 comprises solid or liquid chemical reaction reactants 10 (e.g. FeO), and solid or liquid chemical reaction products 11 (e.g. $Na_2O_2$). An example of the embodiment is the iron-sodium-oxygen flow battery further described in Example 6.

(D) shows an embodiment, where the storage arrangement 5 comprises gaseous electrochemical reaction reactants 6 (e.g. a mixture of $CO_2$ and $H_2O$), and multiple gaseseous electrochemical reaction products 7 (e.g. $O_2$ and $CH_4$). An example of the embodiment is the methane-oxygen flow battery further described in Example 7.

Figure 3:
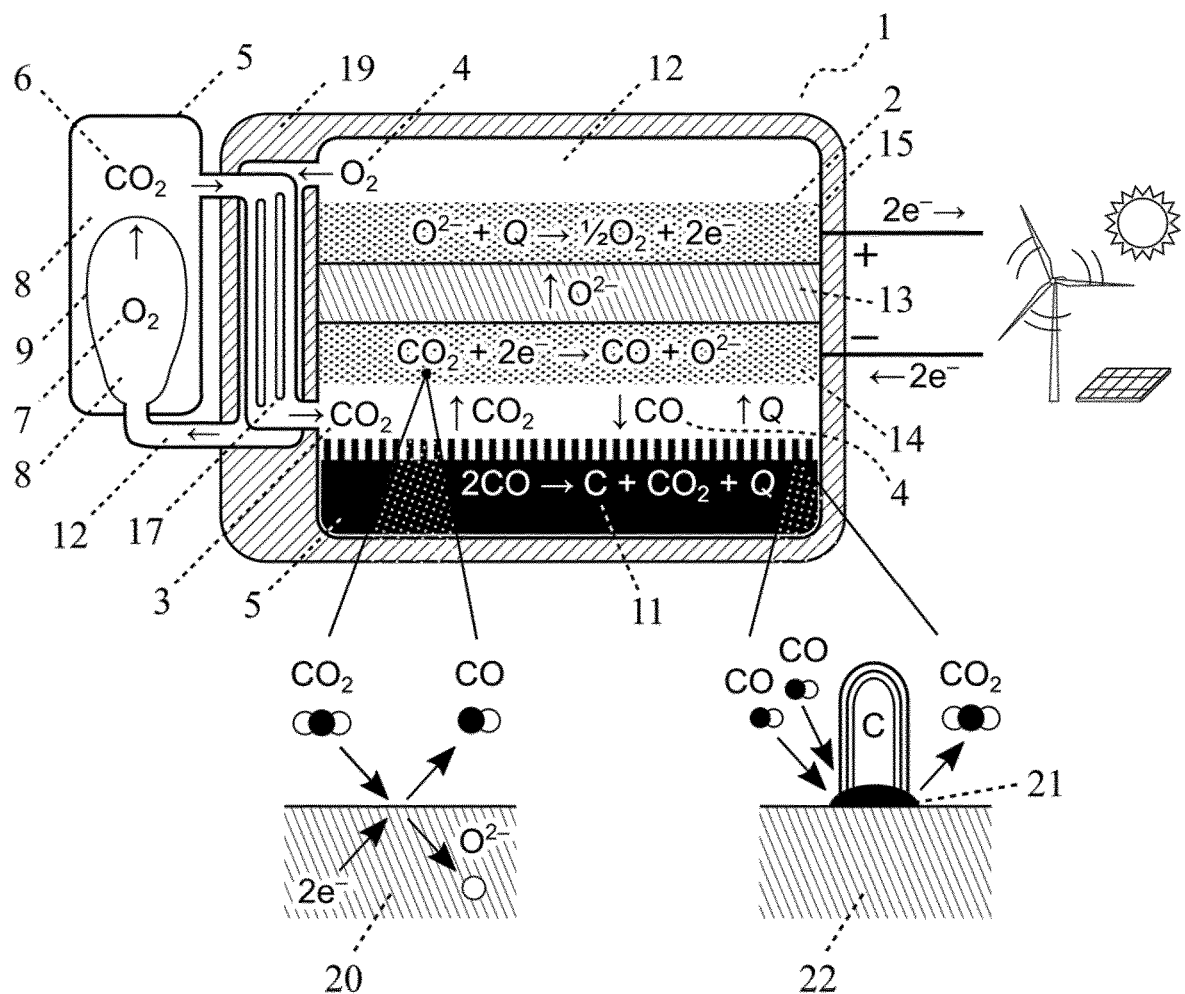

FIG. 3 shows an embodiment of a carbon-oxygen flow battery according to the present disclosure.

Figure 4:
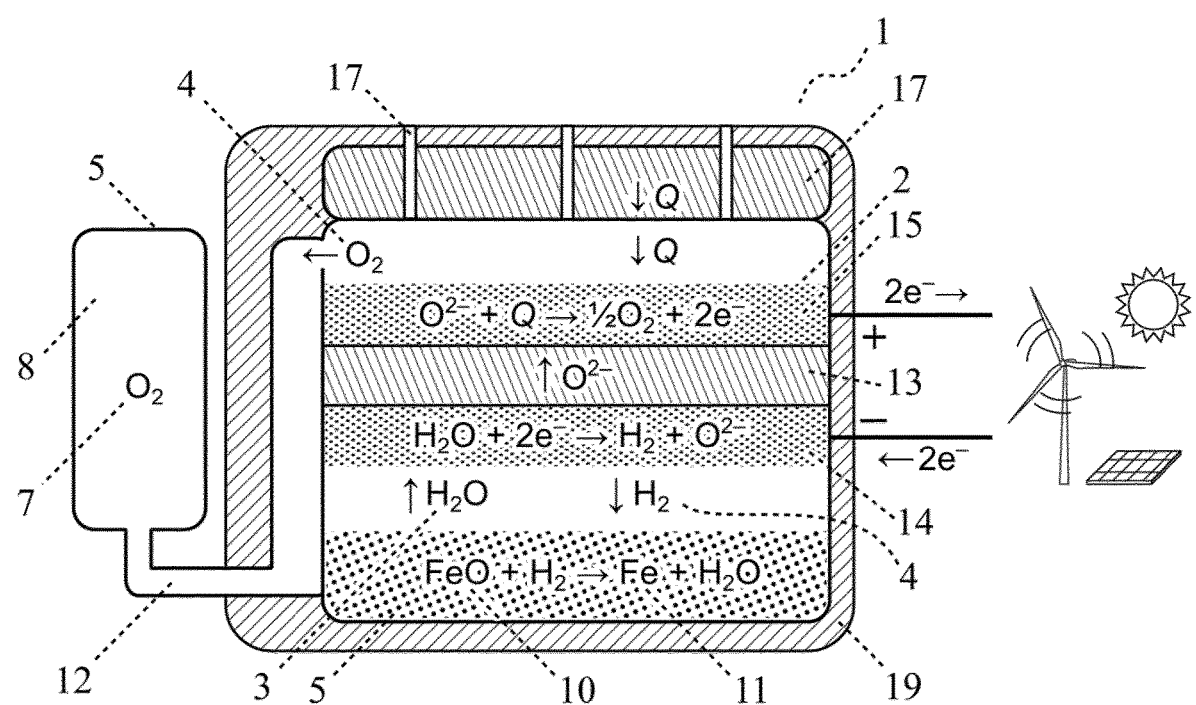

FIG. 4 shows an embodiment of an iron-oxygen flow battery according to the present disclosure.

Figure 5:
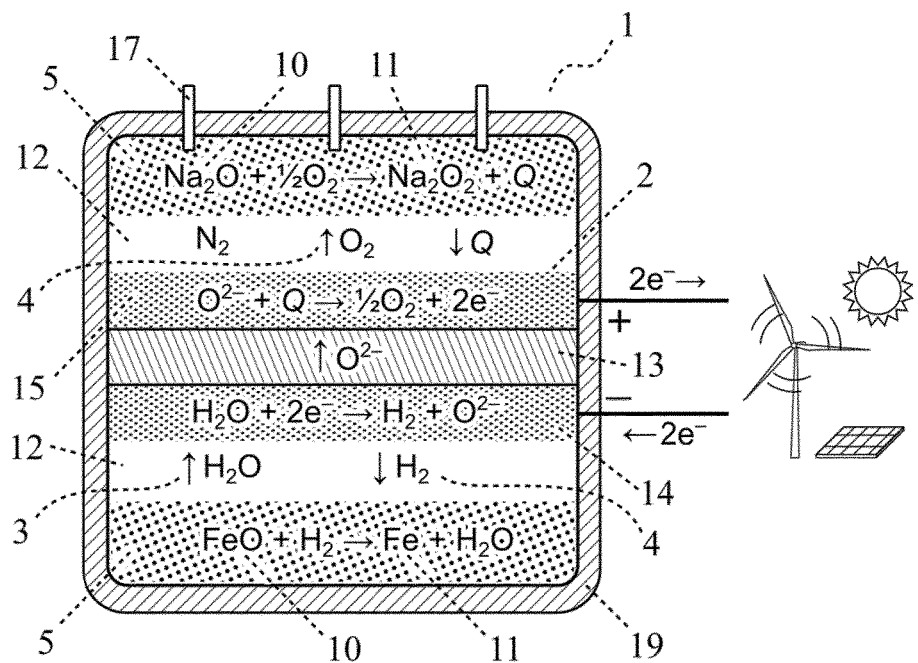

FIG. 5 shows an embodiment of an iron-sodium-oxygen flow battery according to the present disclosure.

Figure 6:
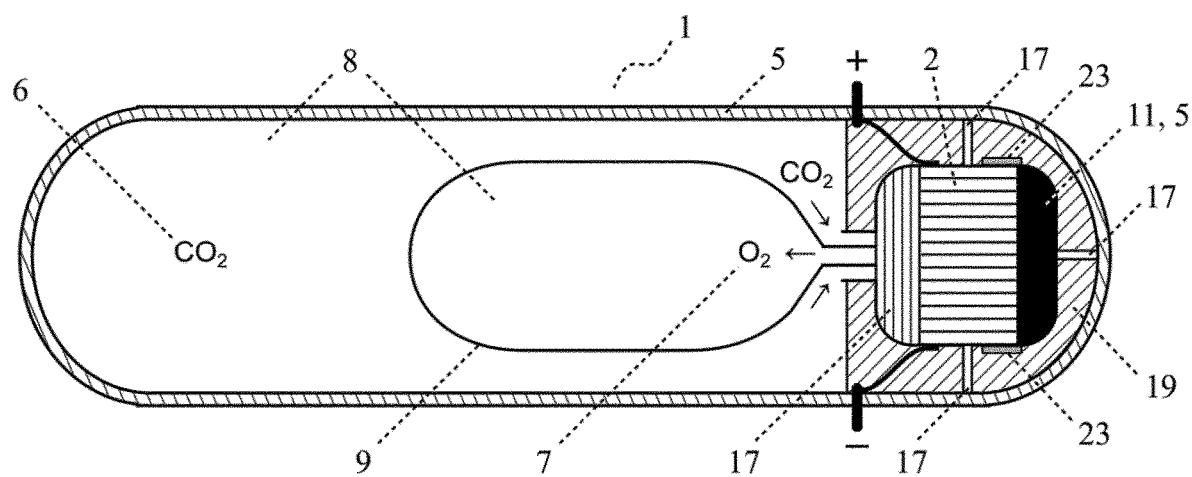

FIG. 6 shows an embodiment of a flow battery system according to the present disclosure during charge mode, where electrical energy is stored by converting $CO_2$ to carbon and oxygen, and a single pressure vessel contains all of the battery components.

Figure 7:
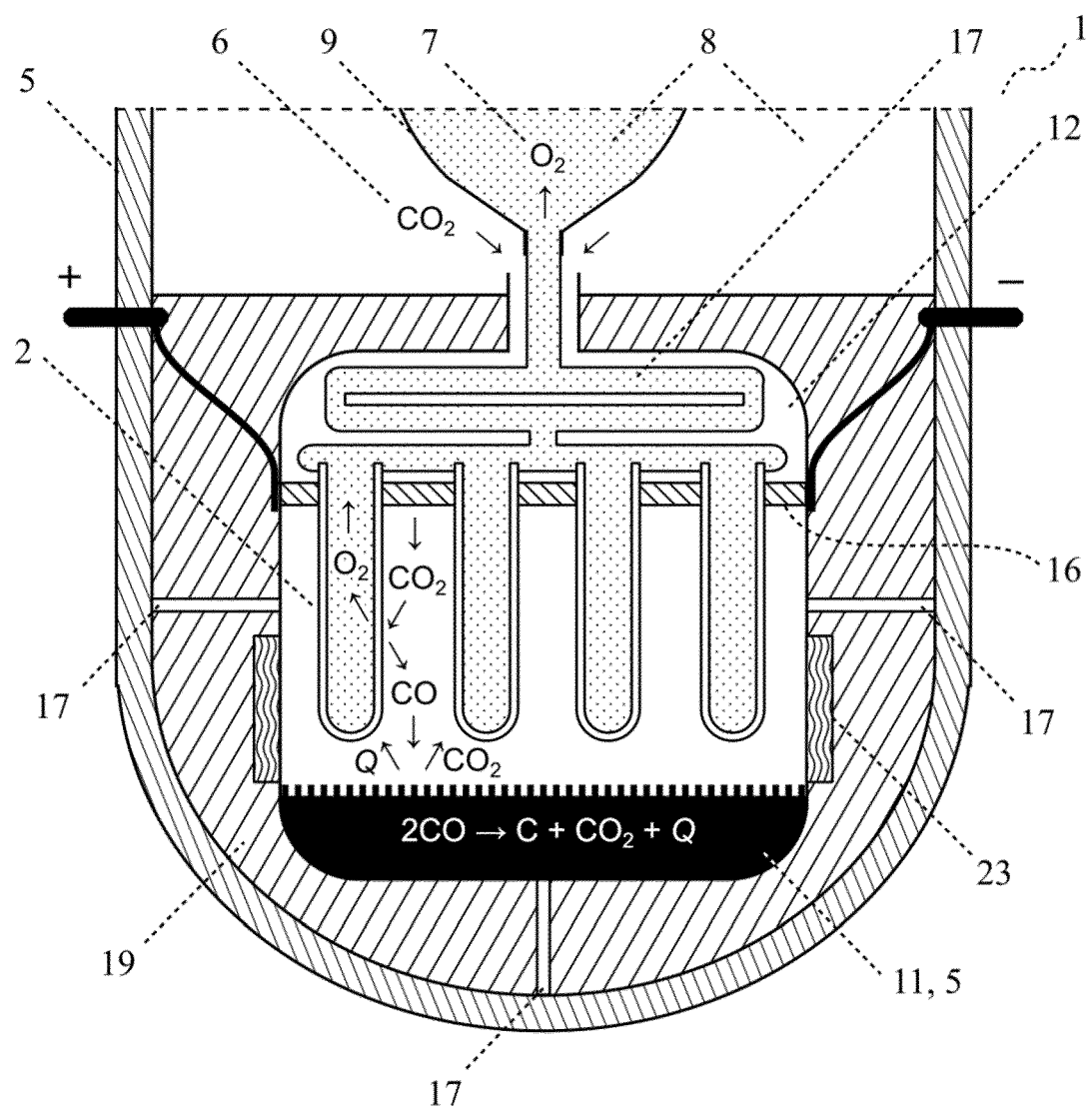

FIG. 7 shows a detailed view of the embodiment of the battery shown in FIG. 6. In this embodiment the cells 2 are tubular in geometry, carbon 11 is formed adjacent to the cells, and the flow battery system comprises a $CO_2$ membrane 16 between the $CO_2$ storage arrangement and the cell.

Figure 8:
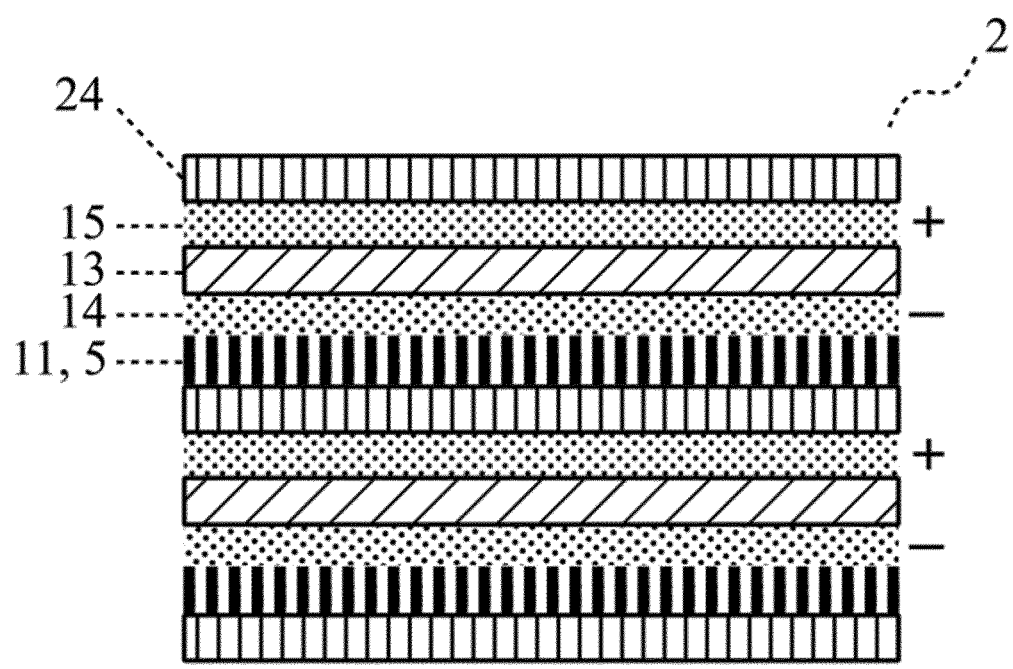

FIG. 8 shows an embodiment of the electrochemical cell stack of the flow battery system according to the present disclosure, wherein the cells 2 are planar in geometry and carbon 11 is formed in the flow channels of the cell stack.

Figure 9:
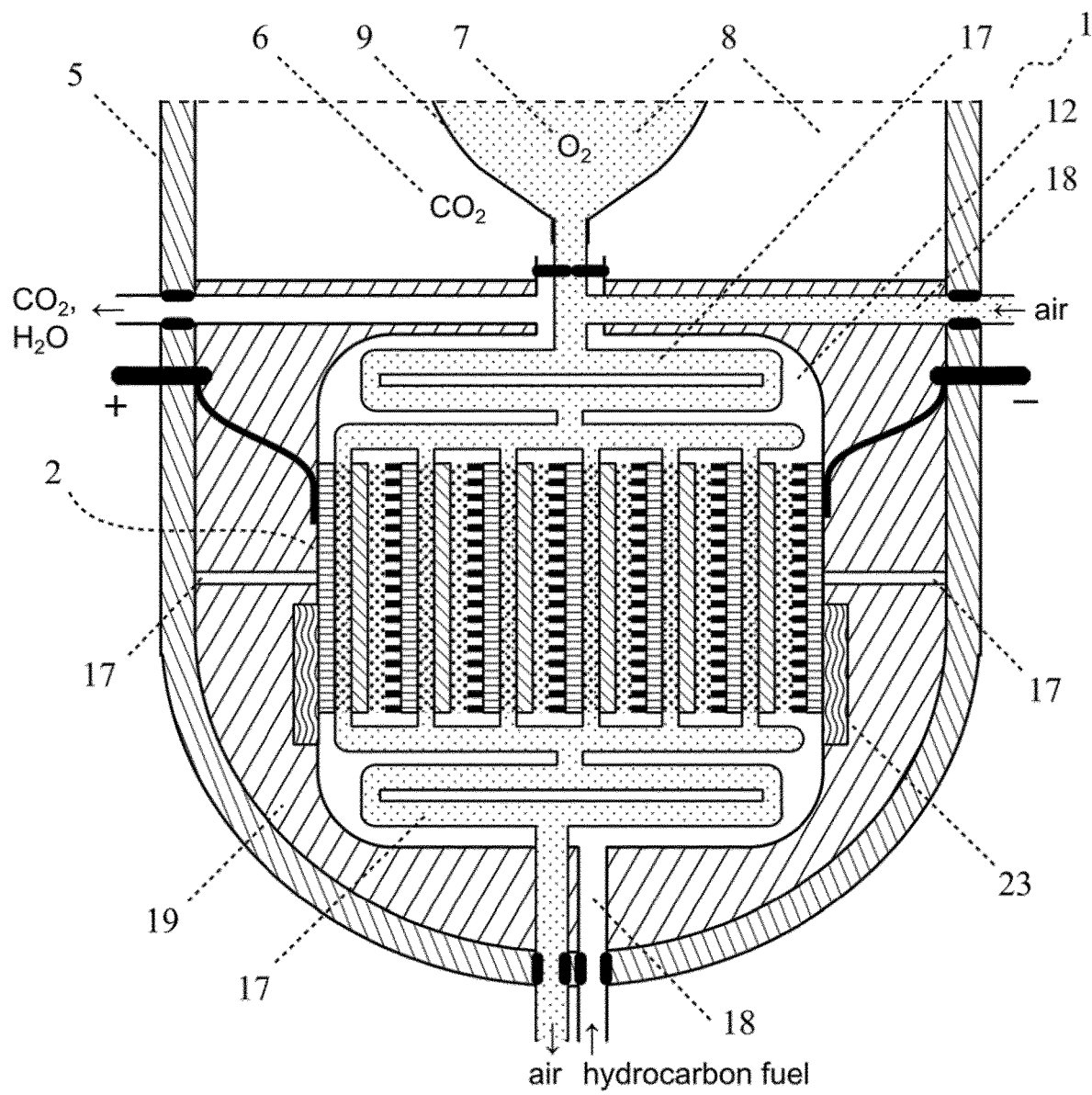

FIG. 9 shows another detailed view of an embodiment of the battery shown in FIG. 6, wherein the cell stack is the one shown in FIG. 8. The flow battery system comprises a second fluid communication system 18 through which hydrocarbon fuel and oxidant are being supplied from an external source to provide electrical power.

DETAILED DESCRIPTION OF THE INVENTION

The disclosure is described below with the help of the accompanying figures. It would be appreciated by the people skilled in the art that the same features or components of the device are referred with the same reference numeral in different figures. A list of the reference numbers can be found at the end of the detailed description section.

Cost Aspects

FIG. 1 shows the estimated cost of the storage capacity ($/kWh) as a function of the storage capacity in hours, or energy to power ratio (hours), for different battery technologies, where LiB=Lithium ion battery, VRFB=Vanadium redox flow battery, RSOC-H2=Reversible solid oxide cell system that electrolyzes steam to hydrogen and oxygen during charge mode, and PFB=a passive flow battery according to the present invention with the carbon chemistry, i.e. corresponding to the embodiment shown in FIG. 3.

The input values of energy capacity cost, power capacity cost, and roundtrip energy storage efficiency are taken from recent literature and for all technologies large scale mass production is assumed. Additional costs of profit margin, financing, power electronics, installation, warranty, etc, are not included. When considering the cost per kWh of electricity stored during the battery lifetime, the round-trip energy storage efficiency would come in and further increase the advantage of the PFB compared with RSOC-$H_2$, due to 80-90% vs 50% roundtrip energy efficiencies, respectively. Such calculations include more assumptions about lifetime and cost of input electricity, and therefore extensive discussion, so they are not included here.

From FIG. 1 it is seen that the passive flow battery (PFB) according to the present invention has a significantly lower cost per kWh storage capacity than any of the other battery technologies. Since the power and energy are decoupled in a flow battery, the storage cost becomes lower with larger storage capacity, so the cost advantage of the passive flow battery occurs for any storage capacity having a capacity size above ca. 3 hours. It is expected to cost more than 80% less than state-of-the-art lithium ion batteries at storage capacities greater than 8 hours.

The rechargeable battery according to the present disclosure is commercially relevant for both stationary electricity storage applications and electric vehicle (EV) applications.

The cost may be estimated based on the known costs for reversible solid oxide cells (RSOCs). A conventional RSOC stack is expected to cost around 200 $/kW (1000 $/m²) at large-volume mass-production. The modifications needed to obtain the battery according to the present disclosure, do not incur significant additional materials or manufacturing costs to the actual stack. Further, for conventional RSOC systems, the known estimates agree that the cost of the balance-of-system components (gas, heat, and electricity flow handling, e.g. pipes, blowers, heat exchangers, inverters) dominates the system cost e.g. that set of components costs considerably more than the stack itself. The battery system according to the present disclosure is self-contained, so the balance-of-system is minimal. In an embodiment of the disclosure, besides the cell stack, the battery system comprises only a pressure-bearing enclosure, a built-in electric heater, a heat exchanger, and an inverter (if AC power is needed). In addition to low cost, this design provides a high energy density of around 300 Wh/kg, 650 Wh/L. For comparison, lithium ion battery packs are ca. 150 Wh/kg, 350 Wh/L.

The low storage cost of the present disclosure is related to the energy storage media. For example, if the energy storage medium is $CO_2$: $CO_2$ has essentially zero cost, and due to the intention of reducing the content of $CO_2$ in the atmosphere, it may in the future even be possible to be paid for storing $CO_2$ in the battery. In contrast, in lithium ion batteries the energy is stored in expensive electrode materials made of lithium, cobalt, nickel, etc.

Electrochemical Cell

A rechargeable battery is an electrochemical device comprising a positive and a negative terminal. When the terminals are connected to an external circuit, the battery may either be used to store electrical energy from the external circuit (i.e. the battery is charging), or the battery may supply power to the external circuit (i.e. the battery is discharging). During charging, the supplied electrical energy is converted and stored as electrochemical products by electrochemically reacting electrochemical reactants within the battery. During discharging, the electrochemical reactions are reversed, and the charge-mode electrochemical products are converted back to the charge-mode electrochemical reactants, whereby the chemically stored energy in the charge-mode electrochemical products is released as current. Thus, the rechargeable battery system 1 of the present disclosure is inherently suitable for being operated in both charging and discharging modes, and the operational mode only depends on the direction of the current to the battery, i.e. the current being either supplied to the battery (charging), or provided by the battery (discharging).

The electrochemical reactions occur at the two electrodes of the electrochemical cell 2. A battery comprises at least one cell, but may also comprise a multiple of electrically connected cells, also known as a stack or a stack of electrochemical cells, where the cells are electrically connected by interconnects.

Each cell comprises a positive electrode 15 and a negative electrode 14 that are separated by an electrolyte 13. Advantageously, the electrodes are porous such that they are permeable for diffusing gaseous electrochemical reaction reactants 3 and products 4. Optionally, the cell is sandwiched between two interconnects. An example of a cell comprising an electrolyte sandwiched between a porous positive electrode and a porous negative electrode is illustrated in FIG. 3.

The cells, interconnects, and stacks may have any form. For example, the cells may have a planar form, thus consisting of planar layers of electrodes, electrolyte, and optionally interconnects 24, as illustrated in FIGS. 3 and 8. Alternatively, the cells may have a tubular form, thus consisting of concentric tubes of electrodes, electrolyte, and optionally interconnects, as exemplified in FIG. 7.

In an embodiment of the disclosure, the electrochemical cell(s) are selected from the group of: planar cells, tubular cells, and any combinations thereof. In a preferred embodiment, the electrochemical cell(s) are of the type tubular cells.

The electrochemical reactions that occur in the cell will be determined by the materials of the electrolyte and electrodes, as well as the composition of the gaseous electrochemical reaction reactants and products. The skilled person within the art will know how to design a cell to promote the selected reactions, for example by the use of catalysts present in the electrodes.

To improve the reaction rates of the electrochemical and chemical reactions, and thus the cost and energy efficiency of the battery system, it is advantageous that the system is operated at elevated temperatures and pressures. Certain electrochemical cells are further advantageously operated more efficiently at elevated temperature and/or pressure. These includes cells comprising electrolytes having higher ionic conductivity at elevated temperatures. For example, the kinetics of the electrochemical reactions and oxygen ion migration within the electrolyte may be enhanced by elevated pressure and/or temperature. Thus, advantageously, the battery system is operated at elevated pressures and/or temperatures.

In an embodiment of the disclosure, the electrochemical cell comprises an electrolyte 13 selected from the group of: solid oxide oxygen ion conductors, molten metal carbonates, molten hydroxides, solid oxide proton conductors.

In another embodiment, the battery system is configured to an operating pressure between 0.1-500 bar, more preferably between 1-300 bar, and most preferably between 50-200 bar. In another embodiment, the battery system is configured to an operating temperature between 400-1000° C., more preferably between 500-900° C., and most preferably between 600-800° C.

The elevated temperatures and pressures may cause one or more of the gaseous phases to be in a supercritical fluid phase.

In an embodiment of the invention, one or more of the gaseous phases within the battery system are fully or partially in the supercritical fluid state. In a further embodiment, the at least one storage arrangement(s) comprises gaseous reactants 6 and/or products 7 that are fully or partially in the supercritical fluid state.

To promote the electrochemical reaction of the negative electrode 14 embodied in FIG. 3, and thus to improve the energy efficiency of the battery system, the negative electrode may comprise certain catalytic materials 21. For example, the negative electrode may comprise a mixed ionic and electronic conductor (MIEC) 20 which promotes the reduction of $CO_2$ to CO (illustrated in FIG. 3 at the bottom to the left) reaction, and a second catalyst for catalysing the deposition of carbon from CO, also known as the Boudouard reaction (illustrated in FIG. 3 at the bottom to the right). FIG. 3 further shows that the catalyst 21 advantageously is supported on a support 22 for improving the catalyst stability.

Optionally, the second catalyst is placed adjacent to the negative electrode, such that the resulting carbon is deposited adjacent to the negative electrode, as illustrated in FIG. 3, element 5.

The electrochemical reaction at the negative electrode may further be controlled by the cell materials. For example, the reduction of $CO_2$ to C may be obtained by the two-step reaction shown in FIG. 3. The thermally coupled two-step reaction scheme is comprised of the endothermic electrochemical reaction $2CO_2 \rightarrow 2CO + O_2$ and the exothermic thermochemical reaction $2CO \rightarrow C + CO_2$.

The two-step reaction is obtained by carrying out the first reaction on electrodes that do not catalyze carbon deposition such as acceptor-doped ceria, yielding a CO partial pressure higher than the thermodynamic threshold for carbon deposition by the Boudouard reaction. The CO molecules then diffuse to a catalyst placed adjacent, such as nickel which carries out the second reaction until the $CO/CO_2$ mixture reaches equilibrium. The net reaction is $CO_2 \rightarrow C + O_2$. For discharge mode, the reactions are reversed.

Thus, the negative electrode may be configured for the two-step carbon deposition reaction by comprising certain materials and structures. For the two-step reaction, certain MIEC electrode materials, on which carbon does not grow, can be used in the first step for producing CO in excess of the thermodynamic threshold for carbon deposition, as described in [1].

For the second step of the reaction, different materials may be used depending on how the reversible carbon deposition and growth should occur. The carbon may grow by tip or base growth. For thermochemical carbon deposition, oxides that exsolve metal carbon deposition catalysts may be applied to obtain thermochemical deposition and potentially provide "base growth" of carbon. For thermochemical deposition, the generally easier to catalyze "tip growth" may produce continuous growth. For "tip growth", pinned catalysts are not necessary and conventional supported catalysts can be used such as a bed of Ni and zirconia particles or Ni nanoparticles coating a zirconia support.

To the electrode and/or catalyst surfaces may be added a coating of a molten alkali carbonate such as $Li_2CO_3$. The main purpose is to improve robustness for reversible carbon deposition. The mobility of the molten phase may help maintain wetting of the catalyst and carbon during reversible deposition cycles. For example, grown carbon fibers that do not "un-grow" in the same path as during growth may break and fall, and if they fall into a molten carbonate then the reversibility can be improved as contact is maintained and the catalysts become well mixed. An additional benefit is that the molten carbonate surface coating may accelerate the reactions.

Finally, a likely optimal growth mode is vertically aligned (VA) growth of carbon nanofibers or nanotubes. Achieving this type of growth has been studied in literature for the production of components made of carbon nanotubes. For the present application, carpets or forests of VA nanofibers could provide highly reversible growth with a high density of carbon—a low porosity with low tortuosity, maintaining gas access for reversible deposition.

Similarly, the positive electrode may comprise a catalyst for promoting oxygen formation. The efficiency of the net electrochemical reaction of the battery cell will depend on the efficiency and selectivity of both the reactions at the positive and negative electrode.

Closed System

The reactants and products of the electrochemical cell reaction are gasses, thus they are in the gaseous state. The reactants and products of the electrochemical cell reaction are therefore denoted "gaseous electrochemical reaction reactants" 3 and "gaseous electrochemical reaction products" 4.

The cell 2 is fluidly connected to a storage arrangement 5 through a first fluid communication system 12, such that the cell and storage arrangement form a closed system. Thus, the first fluid communication system forms a closed system within the battery system. By the term "closed system" is meant a system that is closed for the gaseous reactants and products and any direct chemical derivatives of said reactants and products, thus including any materials which the gaseous reactants and products may be converted from and/or into. Thus, the battery system only contains the gaseous reactants and products present in the closed system.

The closed system means that internal changes in pressure, temperature, and/or concentration gradients occurring any place within the system may generate a flow within all parts of the closed system. For example, the electrochemical reactions occurring within the electrochemical cell during charging, will result in concentration gradients, as illustrated in FIG. 3. At the negative electrode 14, gaseous electrochemical reactant in the form of $CO_2$ 3 is consumed, thus generating a concentration flow from the storage arrangement 5 comprising $CO_2$ 6 to the negative electrode (as indicated by the arrow in the first fluid communication system 12). At the positive electrode 15, gaseous electrochemical product in the form of $O_2$ is formed, thus generating a concentration gradient from the positive electrode to the storage arrangement 5 comprising $O_2$ 7 (as indicated by the arrow in the first fluid communication system 12). The flow from the positive electrode is further pressure driven, at least in the beginning when the gaseous pressure at the electrode will be higher than in the storage arrangement 7.

The example illustrated in FIG. 3 further shows a storage arrangement 5 which forms a closed gas flow system with the cell 2, via a first fluid communication system 12. The storage arrangement comprises a first compartment 6 for the gaseous reactant $CO_2$, and a second compartment 7 for the gaseous product $O_2$, and the two compartments are respectively fluidly connected to the first fluid communication system 12 such that a fluid communication between the $CO_2$ storage and the negative electrode of the cell is formed, thus enabling a flow to the negative electrode, and a fluid communication between the $O_2$ storage and the positive electrode, thus facilitating a flow to the positive electrode. The closed system thus enables a gaseous flow from the $CO_2$ storage and to the $O_2$ storage. The directions of the flows will depend on the whether the battery cell is charging or discharging. During charging the flow directions will be as shown in FIG. 3, and during discharging the flows to and from the negative and positive electrodes will be reversed.

Storage Arrangement

The storage arrangement 5 is configured for storing the gaseous electrochemical reaction reactants 3 and products 4, and/or any direct chemical derivatives of said gaseous reactants and products. By the term "chemical derivative" is meant any component that is formed or derived from another corresponding composition by a chemical reaction. For example, the gaseous electrochemical reaction reactants (e.g. $CO_2$) and products (e.g. CO), may be converted by a chemical reaction into chemical reaction products (e.g. C). The corresponding chemical product (C) is then a direct chemical derivative of the gaseous electrochemical reactants and product.

The storage arrangement is further configured for facilitating a continuous gas flow within all parts of the closed system, during operation, as will be explained below.

For example, in FIG. 3 the gaseous electrochemical reaction reactant comprises $CO_2$, and the gaseous electrochemical reaction products comprise CO and $O_2$. Part of the CO may further be chemically converted to solid carbon, thus carbon is a chemical derivative of $CO_2$, and may also be denoted as a solid chemical reaction product 11.

A chemical reaction product may also be obtained by a reaction with a further material present in the system. For example a solid or liquid chemical reaction product of sodium peroxide ($Na_2O_2$) may be derived from the gaseous electrochemical reaction product of $O_2$ when further chemically reacted with $Na_2O$.

The derived chemical reaction product may also be gaseous. For example, methane ($CH_4$) may be derived from the gaseous electrochemical reaction products of $H_2$ and CO.

Similarly, chemical derivatives of the gaseous electrochemical reaction reactants exist, optionally obtained by reaction with a further material present in the system. For example, the gaseous electrochemical reaction reactant $H_2O$, may be derived from FeO combined with $H_2$. Thus, FeO is a solid or liquid chemical reaction reactant 10.

Thus, the storage arrangement 5 is configured for storing gaseous electrochemical reaction reactants and products, as well as solid or liquid chemical reaction reactants and products. The stored gaseous reactants 6 and products 7 are advantageously stored in one or more separated gas compartments 8. The stored solid or liquid chemical reaction reactants 10 and products 11, such as $Na_2O$ or FeO, are advantageously stored in one or more separated holders or compartments. Further advantageously, the holder or compartment for storing the solid or liquid comprises a further material, to catalyze or aid in the formation of a chemical derivative. Advantageously, the further material is a liquid media, which may be easily stored within a compartment of the storage arrangement.

In an embodiment of the disclosure, the storage arrangement 5 comprises two or more separated gas compartments 8 configured for storing one or more gaseous electrochemical reaction reactants and/or products, and/or gaseous derivatives thereof.

In an embodiment of the disclosure, the storage arrangement is configured for storing at least one of the gaseous electrochemical reaction products, in a solid and/or liquid form, optionally obtained by chemical reaction with one or more further material(s).

In an embodiment of the disclosure, the storage arrangement is configured for storing at least one of the gaseous electrochemical reaction reactants and products, in a condensed phase, such as a solid and/or liquid form, obtained by chemical reaction with one or more further material(s).

In a further embodiment, the storage arrangement comprises at least one compartment for storing solid or liquid chemical reaction reactants or products. In a further embodiment, the storage arrangement further comprises a holder for the stored chemical reaction reactant in a solid and/or liquid form 10, and/or a holder for the stored chemical reaction product in a solid and/or liquid form 11. In a further embodiment, the storage arrangement 5 further comprises one or more liquid media, selected from the group of: molten salts, molten metals, and liquid additives, such as metal carbonates, nitrates, halogens, phosphates, antimony, and/or tin.

Storing the gaseous electrochemical reactants and products as solid or liquid chemical reaction reactants/products, or chemical derivatives, has the advantage of improving the simplicity, efficiency, and volume efficiency of the system, since the gaseous phases are stored in a more concentrated form.

Storing the gaseous electrochemical products as solid or liquid chemical reaction products, or chemical derivatives, has further the advantage that it may facilitate a sufficient continuous gas flow within all parts of the closed system, during continues operation, such as charging. For example, as described above to FIG. 3, gas concentration gradients (of $CO_2$ and $O_2$) occur between the cell and storage arrangement during charging due to the electrochemical reaction. Thus, the concentration gradients enable a gaseous flow from the $CO_2$ storage and to the $O_2$ storage within all parts of the closed system. The electrochemical reaction may further facilitate a gas pressure gradient. For example, the flow from the positive electrode in FIG. 3 is further pressure driven, at least in the beginning when the gaseous pressure at the electrode will be higher than in the storage arrangement. The gas pressure gradient will be further enhanced if the storage arrangement comprises liquid or solid form products, such as solid C. The solid stored carbon will have a much lower gas pressure than the corresponding gaseous phases, and will thus induce a gas pressure driven flow. Thus, to ensure sufficient continuous gas flow, it is an advantage that the storage arrangement comprises at least one condensed phase, such as a solid or liquid chemical reaction product.

In an embodiment of the disclosure, the at least one chemical reaction product(s) is in a condensed phase, such as a solid and/or liquid form, whereby a lower gas pressure than the corresponding gaseous electrochemical reaction product(s) is obtained upon formation.

A more concentrated form may be obtained by condensation, deposition or desublimation, or by chemical reaction with one or more further material(s), also denoted as a further storage material(s).

Figure 2:
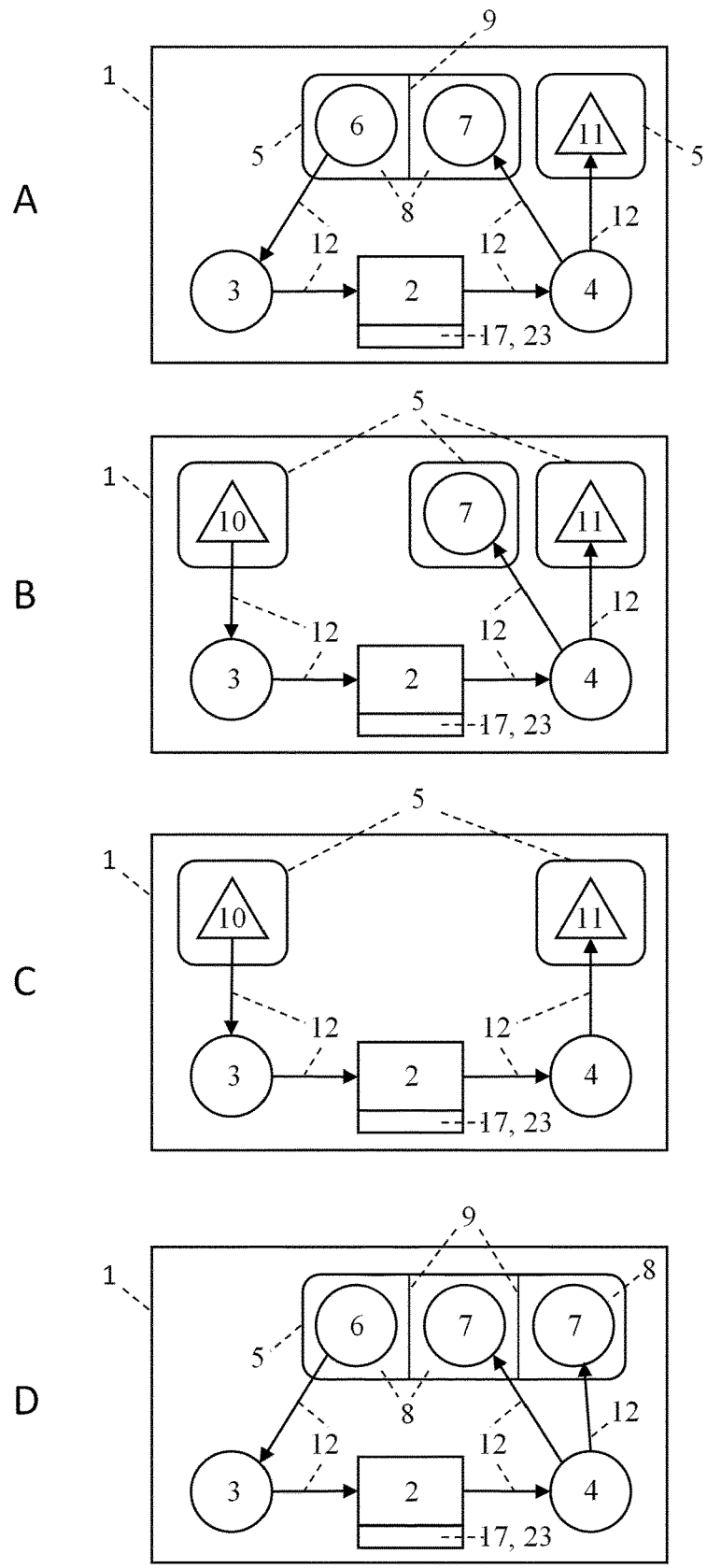
FIG. 2 shows sketches of four embodiments of the present disclosure.

FIG. 2 shows sketches of four embodiments of the storage arrangement. In FIG. 2A, the storage arrangement comprises three separated compartments, of which two compartments are gas compartments 8, comprising respectively stored gaseous reactant 6 and stored gaseous product 7. The stored gaseous reactant and product are identical to the gaseous electrochemical reaction reactant and product. The third compartment comprises a solid or liquid chemical reaction product 11. For example, the storage arrangement 5 may comprise gaseous electrochemical reaction reactants 6 (e.g. $CO_2$), gaseous electrochemical reaction products 7 (e.g. CO and $O_2$) and solid or liquid chemical reaction products 11 (e.g. solid carbon). Examples of the embodiment include the carbon-oxygen flow battery, which is further described in Examples 1-3, and the sulfur-oxygen flow battery further described in Example 4.

FIG. 2B shows an embodiment, where the storage arrangement 5 comprises solid or liquid chemical reaction reactants 10 (e.g. FeO), gaseous electrochemical reaction products 7 (e.g. $O_2$), and solid or liquid chemical reaction products 11 (e.g. Fe). An example of the embodiment is the iron-oxygen flow battery further described in Example 5.

FIG. 2C shows an embodiment, where the storage arrangement 5 comprises solid or liquid chemical reaction reactants 10 (e.g. FeO), and solid or liquid chemical reaction products 11 (e.g. $Na_2O_2$). An example of the embodiment is the iron-sodium-oxygen flow battery further described in Example 6.

FIG. 2D shows an embodiment, where the storage arrangement 5 comprises gaseous electrochemical reaction reactants 6 (e.g. a mixture of $CO_2$ and $H_2O$), and multiple gaseous electrochemical reaction products 7 (e.g. $O_2$ and $CH_4$). An example of the embodiment is the methane-oxygen flow battery further described in Example 7.

The storage arrangements 5 exemplified in FIGS. 2A and 2D comprises two or more gas compartments 8. If the volumes of the gas compartments are fixed, the gas pressure in each of the gas compartments will vary during operation. For example in FIGS. 2A and 2D during charging, the gas pressure of the stored gaseous reactants 6 will decrease as the reactants are consumed in the electrochemical cell, while the gas pressure of the stored products 7 will increase as the products are formed. To avoid pressure regulating means in the storage arrangement, the gas compartments are advantageously pressure balanced. By the term "pressure balanced" is meant that the total pressure of the storage arrangement, i.e. the sum of gas pressures in all of the gas compartments is constant or maintained.

Pressure balancing during battery operation may be obtained when the total volume of the multiple gas compartments are kept constant, while the volumes of the separated gas compartments are varied interdependently. For example, a storage arrangement comprising two compartments, where the gas pressure of the first compartment is halved, and the volume of the first gas compartment is also halved, and where the gas pressure of the second compartment is doubled, and the volume of of the second gas compartment is also doubled, will have the same total pressure and total volume of the compartments and thus be pressure balanced.

FIG. 3 shows an embodiment of a storage arrangement 5, comprising multiple gas compartments 8, where pressure balancing is obtained by a moveable barrier 9, where the movability facilitates that the total gas pressure and the total volume of the gas compartments are kept constant. As further shown in FIG. 3, the moveable barrier may have the form of an inflatable balloon or bladder. In addition, or alternatively, the moveable barrier could have the form of a piston.

In an embodiment of the disclosure, the at least one storage arrangement 5 comprises multiple gas compartments 8, and wherein the multiple gas compartments are configured to be pressure balanced. In a further embodiment, the multiple gas compartments 8 are separated by one or more moveable barriers(s) 9, adapted such that the battery system is configured to maintain an essentially equal pressure in the multiple gas compartments. In a further embodiment, the moveable barrier(s) 9 are selected from the group of: a moveable piston, an inflatable balloon or bladder, or any combinations thereof.

FIG. 3 may also be described as an embodiment of a combined $O_2$—$CO_2$ tank or storage arrangement. For the battery system to work, a source of $O_2$ and $CO_2$ is needed. If the battery system had two separate tanks for $CO_2$ and $O_2$ this would mean that as the battery charges, the pressure of the $CO_2$ side of the cells decreases and the $O_2$ pressure increases. However, in FIG. 3 the $CO_2$ and the $O_2$ are stored in a combined storage arrangement. Having balanced the $CO_2$ side and $O_2$ side pressure makes it possible to keep everything at the same pressure. This may be accomplished by allowing the volume of the tanks to vary with an inflatable balloon of $O_2$ inside the $CO_2$ tank, or similarly with a piston or diaphragm, as illustrated by the arrow between the compartments in FIG. 3. If the $O_2$ was not stored, but supplied externally from the air, then a compressor would be needed to compress the air, and/or a large pressure gradient from $CO_2$ side of the cell to the air side would be needed.

FIG. 3 further shows an embodiment, where during charging, the gaseous reactant $CO_2$ is converted to a gaseous product $O_2$. Inherently this means that the gas pressures within the storage arrangement will change, i.e. the gas pressure of the first compartment 6 will decrease, while the gas pressure of the second compartment 7 will increase.

For electrochemical cell reactions, where the molar ratio between the gaseous reactants and the gaseous products of the net electrochemical reaction is 1, the decrease and increase in gas pressure will be corresponding, and thus may be said to be balanced. Since the decrease in pressure of the reactant compartment is equal to the increase in pressure in the product compartment, the combined gas compartments will have a total pressure that is maintained constant, when the volume changes of the compartments are varied interdependently. Thus, the combined storage arrangement facilitates a simple, volume efficient, and energy efficient battery system.

To improve the simplicity and compactness of the battery system, all of the battery system components are advantageously integrated with the storage arrangement into a single unit, such as a single vessel. An embodiment of an integrated, compact battery system is exemplified in FIG. 6. FIG. 6 shows an embodiment of a flow battery system according to the present disclosure during charge mode, where electrical energy is stored by converting $CO_2$ to carbon and oxygen, and a single pressure vessel contains all of the battery components.

In an embodiment of the disclosure, the at least one storage arrangement 5 is integrated within the electrochemical cell or cell stack. In a further embodiment, the battery system is integrated into a single unit, such as a vessel.

In an embodiment of the disclosure, the electrochemical cell or cell stack is integrated within the at least one storage arrangement. In a further embodiment, the battery system is integrated into a single unit, such as a vessel.

Automatic Gas Flow

Battery systems including gaseous reactants and products conventionally require flow-generating equipment such as pumps and compressors, thereby ensuring a sufficient flow of reactants and products to and from the electrodes during charging or discharging.

The present invention surprisingly provides a flow battery system, where the need for flow-generating equipment is avoided. This is obtained by a system comprising a storage arrangement for storing the gaseous electrochemical reaction reactants and products and their chemical derivatives, wherein at least one of the gaseous electrochemical reaction products is stored as at least one chemical reaction product having a lower gas pressure than the corresponding gaseous electrochemical reaction products, and where the storage arrangement and electrochemical cell is fluidly connected to form a closed system within the battery system.

Conventional flow batteries and reversible solid oxide cell systems have up to 20 components, such as compressors, expanders, condensers, pumps, heat exchangers, for flow and heat management. These balance-of-system components are still essential to ensure the gasses flow, even when they use a single tank for the fuel and exhaust reservoirs of one side of the cell. The balance-of-system components are expensive, and further require a complicated control system that ensures that the gas flow matches the current density, and that active heat transfer fluid flows for cooling etc. A battery system with a minimum of components is advantageous for commercial reasons, and will have the technical benefits of reduced complexity, improved safety and efficiency.

In an embodiment of the invention, the system is configured to operate without pressure balancing means, and/or flow control means, such as pumps, compressors, blowers, and condensers.

In the present disclosure, an automatic gas flow between the storage arrangement and the cell is obtained by the at least one stored chemical reaction product having a lower gas pressure than the corresponding gaseous electrochemical reaction products. The lower gas pressure of the stored product in the storage arrangement will induce a pressure driven gas flow from the cell to the storage arrangement. Since the storage arrangement and cell forms a closed system, and the storage arrangement further advantageously is pressure-balanced, the pressure driven gas flow may induce an automatic flow within any parts of the first fluid communication system of the battery system.

For the battery to operate efficiently, the gas flow between the storage arrangement and cell further needs to be sufficient, such that the electrochemical reaction will not be restricted by e.g. a low supply of gas molecules.

A sufficient gas flow, and a lower gas pressure of the stored chemical reaction product may be obtained if the gaseous electrochemical product is stored as a liquid or solid, since the gas pressure of a liquid or solid will be lower than the corresponding gaseous components.

This is the case in carbon-oxygen passive flow batteries, sulfur-oxygen passive flow batteries, iron-oxygen passive flow batteries, and iron-sodium-oxygen passive flow batteries.

Alternatively a lower gas pressure of the stored chemical reaction product may be obtained if the gaseous electrochemical product is stored as a gaseous compound with a decreased number of gas molecules. This is the case in the methane-oxygen passive flow battery further described in Example 7, and further illustrated in FIG. 2D. In the methane-oxygen passive flow battery one molecule of methane is produced and stored, from two molecules of $H_2O$ and one molecule of $CO_2$, i.e. the number of gas molecules in the stored chemical reaction product is reduced from three to one.

To facilitate a sufficient gas flow, it may further be advantageous that the storage arrangement is connected to the cell via one or more valve(s) or membrane(s), which are selective to certain predefined gas molecules, e.g. by being permeable to only certain gas molecule sizes. In an embodiment of the invention, the storage arrangement further comprises one or more valve(s) or membrane(s), which are selective to certain predefined gas molecules. Electronically controlled valves that are not selective may also be used to facilitate sufficient gas flow and prevent mixing during idle operation.

The carbon-oxygen passive flow batteries, sulfur-oxygen passive passive flow batteries, iron-oxygen passive flow batteries, and iron-sodium-oxygen passive flow batteries will be further described below.

Carbon-Oxygen Passive Flow Battery

The carbon-oxygen passive flow battery is further described in FIG. 2A, Examples 1-3, and the similar sulfur-oxygen passive flow battery is further described in Example 4.

FIG. 3 shows an embodiment of the carbon-oxygen passive flow battery system according to the present disclosure during charge mode. Surplus electricity, e.g. from solar or wind power sources, is stored by converting $CO_2$ to carbon and oxygen. The carbon is formed by a two-step reaction, where CO is first produced by $CO_2$ electrolysis and then carbon is deposited from CO by the Boudouard reaction. The two-step reaction is additionally illustrated as individual reactions at the gas/solid interfaces (electrode and catalyst). At the bottom of FIG. 3, and to the left, is sketched the CO production, and at the bottom to the right is sketched the Boudouard reaction.

The storage arrangement 5 comprises multiple gas compartments 8, forming a combined storage arrangement, or a single-tank storage with $O_2$ stored in a balloon inside the $CO_2$ tank, to maintain a constant pressure during all charging/discharging. The carbon-oxygen passive flow battery further comprises a heat exchanger 17, to improve the energy efficiency of the system.

For the example shown in FIG. 3, the automatic gas flow within the battery system is caused by the pressure difference occurring within the negative electrode, when gaseous $CO_2$ is reduced to carbon. Since the gaseous molecules are converted into solid, the gas pressure within the electrode will decrease as the reaction occurs. Thus, there will be a pressure- and diffusion driven flow of $CO_2$ from the storage to the negative electrode. Similarly, there will be a pressure- and diffusion driven flow from the positive electrode and towards the $O_2$ storage, since the concentration of $O_2$ will be higher within the electrode, where the oxygen is formed.

Thus, the automatic gas flow is driven by the internal gas pressure- and concentration differences. Due to the closed system, the gas pressure driven automatic flow may further induce additional flows driven by internal differences in temperature and/or chemical concentration within the closed system.

The embodiment shown in FIG. 3 illustrates a cell, where the molar ratio between the gaseous reactant (1 mole of $CO_2$) and the gaseous product (1 mole of $O_2$) of the net reaction is 1, and the number of gaseous molecules of the net electrochemical reaction is 2.

The configuration of the combined cell and gas storage tank illustrated in FIG. 3, may be used with any battery chemistries, which enable the net reaction: $CO_2 \rightarrow C+O_2$. The net reaction has the same number of gas molecules on each side of the reaction, and the chemical reaction product (C) has a lower gas pressure than the corresponding gaseous electrochemical reaction product (CO), resulting in no need for flow control. Thus, the battery system is operated with passive flow. For passive flow to occur, it is essential that a gaseous phase is present, whereby the term "gaseous" is meant a gas phase or a supercritical fluid phase.

Thus, it was seen that advantageous automatic flows with sufficient flow rates may be obtained for net reactions where the molar ratio between the stored gaseous reactants and stored gaseous products is 1. Further advantageous and sufficient automatic flows may be obtained for cells where the number of gas molecules decreases from the electrochemical reaction product to the chemical reaction product by a number of 1, 2 or 3.

In an embodiment of the disclosure, the automatic gas flow is configured to be generated by an internal difference in gas pressure, chemical concentration, and/or temperature within the closed system. In a further embodiment, the molar ratio between the stored gaseous reactant and stored gaseous product is 1. In a further embodiment, the number of gas molecules decreases from the electrochemical reaction product to the chemical reaction product by a number of 1, 2 or 3.

Iron-Oxygen Passive Flow Battery

The iron-oxygen passive flow battery is further described in Example 5.

FIG. 4 shows an embodiment of the flow battery system according to the present disclosure during charge mode, wherein electrical energy is stored by converting FeO to Fe and oxygen.

FeO is stored in the storage arrangement 5, such as in a separate compartment 10 as illustrated in FIG. 2B, or in a compartment 10 adjacent to the negative electrode as illustrated in FIG. 4.

Fe is formed by a two step reaction, where $H_2$ is first produced by $H_2O$ electrolysis and then Fe is formed by chemical reduction of FeO with $H_2$.

The net reactions of the cell are highly endothermic in charge mode and exothermic in discharge mode. Thus, to improve the efficiency of the electrochemical reactions, the electrochemical cell is advantageously integrated in thermal communication with a temperature-regulating heat transfer means 17.

Examples of temperature-regulating heat transfer means are high-temperature phase-change materials (PCMs) and heat pipes, as exemplified in FIG. 4. For example, the PCM may provide heat to the cell during charge mode, thereby improving the electrochemical reaction rates. PCMs and heat pipes are advantageous because they may provide passive heat management, e.g. a PCM releases heat during endothermic charge mode as shown in FIG. 4, and absorbs heat during exothermic discharge mode. Heat pipes release heat from the system when needed, i.e. when the temperature exceeds heat pipe liquid-gas phase transition temperature. This way the roundtrip energy efficiency compared to the case without PCM will be improved.

A single gas, $O_2$, is stored, which means the pressure in the gas compartment varies from low to high during charge. Pure $O_2$ (instead of air) and pressurized and connected with this arrangement enables passive flow.

To further enable sufficient automatic flows within the system, the iron-oxygen passive flow battery in addition, or alternatively, comprises a further storage compartment comprising a solid or liquid chemical reaction product such as sodium peroxide, such as illustrated in FIGS. 2B, 2C, and 5. The iron-sodium-oxygen passive flow battery is further described below.

Iron-Sodium-Oxygen Passive Flow Battery

The iron-sodium-oxygen passive flow battery is further described in FIGS. 2B, 2C, and 5, and Example 6.

FIG. 5 shows an embodiment of the flow battery system according to the present disclosure during charge mode, wherein electrical energy is stored by converting FeO and $Na_2O$ to respectively Fe and $Na_2O_2$.

In the negative electrode chamber, Fe is formed by a two step reaction as in the iron-oxygen passive flow battery exemplified in FIG. 4.

In the positive electrode chamber, $Na_2O_2$ is formed by a two step reaction by electrochemical oxygen evolution followed by oxidation of $Na_2O$ to $Na_2O_2$.

Thus, FIG. 2B shows an embodiment where the storage arrangement 5 comprises solid or liquid chemical reaction reactants 10 (e.g. FeO), gaseous electrochemical reaction products 7 (e.g. $O_2$), and solid or liquid chemical reaction products 11 (e.g. Fe). An example of the embodiment is the iron-oxygen flow battery further described in Example 5. FIG. 2C shows an embodiment where the storage arrangement 5 comprises solid or liquid chemical reaction reactants 10 (e.g. FeO), and solid or liquid chemical reaction products 11 (e.g. $Na_2O_2$).

The net reactions of the cell in both charge and discharge modes are exothermic except at low overvoltages in discharge mode. Further, the $Na_2O_2$ reaction provides thermochemical heat storage during discharge mode and heat release during charge mode as indicated in FIG. 5.

To further improve the energy efficiency of the system, the cell is advantageously integrated in thermal communication with a temperature-regulating heat transfer means 17, such as for example a PCM. The PCM is then used for absorbing heat during operation in either mode, and releasing the heat during idling.

Temperature-Regulating Heat Transfer Means

The electrochemical reactions as well as the chemical reactions occurring within the battery system will to some degree be endothermic and/or exothermic. Thus, by utilizing the heat from an exothermic reaction, in an endothermic reaction, and vice versa, the energy efficiency of the battery system may be improved. A further advantage is that the electrochemical cell may be kept isothermal.

To obtain utilization of the heat generated in one part of the system, in another part of the system, or in the same part of the system at a later time, temperature-regulating heat transfer means may be used. The temperature-regulating means are integrated in thermal communication with a part of the cell, such that heat produced at that part may be transferred and stored for later use, or transferred to another part of the system.

Examples of temperature-regulating heat transfer means include high-temperature PCM, such as molten NaCl or $MgCl_2$, and heat pipes. The molten salt $MgCl_2$ has a low cost ($1/kWh thermal energy stored for the raw material) and melting point of 712° C.

In an embodiment of the disclosure, the system further comprises one or more passive, temperature-regulating heat transfer means 17, such as a high-temperature PCM or thermochemical energy storage subsystem for storing and retrieving heat, and/or a heat pipe subsystem for transferring heat generated inside the system to the outside.

The integrated design involves placing the temperature-regulating heat transfer means (e.g. PCM) around the stack as an envelope or integrating the PCM into the cell/stack structure. FIG. 4 shows an embodiment of a passive flow battery system according to the present disclosure, where a high-temperature PCM is integrated into and in thermal communication with the cells or stack of cells.

Thus, the temperature-regulating heat transfer means has the function of storing the heat between exothermic and endothermic modes. Furthermore, they make the cell/stack operation closer to isothermal, both while operating and also to maintain temperature during idle periods.

Idle periods will otherwise require continuously providing a small amount of electric heating or operating the battery with a trickle current to keep it hot and maintain elevated temperatures. Thus, the energy loss of the system is decreased.

Calculations show that the heat stored by operation for 1 h can keep the battery at operating temperature during idling for up to 2 days, depending on the insulation properties. This would decrease or eliminate the energy capacity loss with time that would be needed to achieve a desirable goal for the novel battery: to keep it at operating temperature for its entire lifetime. The purpose is to enable higher efficiency energy storage and to prolong lifetime by avoiding thermal cycling.

Thus, the temperature-regulating heat transfer means facilitate that a desired temperature may be maintained while the battery is idle. For example, in some embodiments it may be advantageous to keep the battery at 700° C. for its entire lifetime, so if it is not used for 3 h or even 30 h, it will maintain that temperature. By using the heat stored in the e.g. PCM without any active control of heating needed, it would be possible to maintain temperature for up to several days without wasting any of the stored energy capacity of the battery.

In a further example, the roundtrip energy efficiency may be low, for example for an iron-oxygen battery. However, if the energy losses during exothermic fuel-cell mode are stored as heat by melting the PCM, and the heat is retrieved during endothermic electrolysis mode, the roundtrip efficiency may be increased. Thus, by storing heat during exothermic operation mode for use during endothermic operation mode, the efficiency is increased. This is particularly suitable for electrochemical cell reactions that have a larger difference between the free energy and enthalpy of reaction, like FeO→Fe+½$O_2$, which is strongly exothermic in discharge mode and endothermic in charge mode.

Thus, advantageously the temperature-regulating heat transfer means are operated passively without any external control necessary. To further improve the efficiency and lifetime of the heat transfer means, it is advantageous that the battery system is sufficiently thermally insulated. Advantageously, at least the cell/stack is partly encapsulated by insulation. FIGS. 3-7 show embodiments, where the system comprises thermal insulation 19 encapsulating the cell/stack.

In an embodiment of the disclosure, the system further comprises thermal insulation 19 at least partly encapsulating the cell/stack.

Gas Separation Membrane

The storage arrangement 5 may comprise one or more gas compartments 8. The stored gasses are either gaseous electrochemical reaction reactants or gaseous electrochemical reaction products or gaseous derivatives. The electrochemical reactions may produce one or more products. For example, the carbon-oxygen battery exemplified in FIG. 2A operates by stored $CO_2$ being converted to stored $O_2$ and C.

Since certain gasses and gas mixtures are toxic and/or explosive, especially in the larger volumes present in the storage arrangement, it may be advantageous to ensure that the stored gasses have a certain composition. This may be obtained by including a gas separation membrane between the cell and the storage arrangement. The gas separation membrane is only permeable for certain gas species. For example, a carbon dioxide separation membrane is only permeable for $CO_2$ molecules.

In an embodiment of the invention, the system further comprises a gas separation membrane.

For example, for safety purposes in the carbon-oxygen passive flow battery shown in FIG. 3, it would be advantageous to store pure $CO_2$ rather than a mixture of $CO/CO_2$. This may be obtained if the operational temperature is around 600° C. so that the equilibrium $CO/CO_2$ gas composition corresponding to Boudouard carbon deposition is very $CO_2$-rich ($xCO:xCO_2=2:98$ at 600° C. and 200 bar) and then including a Boudouard catalyst at the outlet pipe to the $CO_2$ storage tank where at lower temperature the equilibrium goes to ppm levels of CO, as described in [1]. However, for operation at higher temperature, where the energy efficiency is also higher, ensuring storage of pure $CO_2$ may be obtained by use of a carbon dioxide separation membrane. Thus, the inclusion of a $CO_2$-selective membrane can provide extension of operation regime and improved efficiency. By only allowing $CO_2$ through the membrane to the storage tank, wider ranges of operating temperature and pressure can be chosen. FIG. 7 shows an embodiment of the flow battery system according to the present disclosure during charge mode, wherein the flow battery system comprises a $CO_2$ membrane between the $CO_2$ storage arrangement and the cell.

In an embodiment of the disclosure, the system further comprises a carbon dioxide separation membrane 16 for separating carbon dioxide from a gas mixture. In a further embodiment, the carbon dioxide separation membrane is positioned between the cell and the at least one storage arrangement 5.

Examples of carbon-oxygen passive flow batteries comprising a carbon dioxide separation membrane are further described in Examples 2-3.

Gaseous Electrochemical Reactants and Products

The passive flow battery described in the present disclosure may be based on different electrochemical reaction chemistries, and further on different chemical reactions for storing the electrochemical reaction reactants and products. However, the energy efficiency of the system, and the degree of automatic gas flow between the storage arrangement and cell, i.e. the flow rates generated, will depend on the reaction chemistries.

Surprisingly high energy efficiency and advantageous and sufficient automatic gas flows are obtained for the described carbon-oxygen passive flow battery, sulfur-oxygen passive flow battery, iron-oxygen passive flow battery, iron-sodium-oxygen passive flow battery, and methane-oxygen passive flow battery.

Thus, it is advantageous that the gaseous electrochemical reaction reactants have certain compositions, and further that at least one of the gaseous electrochemical reaction reactant is stored as a chemical reaction reactant of a certain composition.

In an embodiment of the disclosure, the gaseous electrochemical reaction reactant(s) 3 in charge mode are selected from the group of gaseous oxides including: carbon dioxide ($CO_2$), carbon monoxide (CO), water vapor ($H_2O$), sulfur oxides ($SO_2$), and any combinations thereof. In a further embodiment, at least one of the gaseous electrochemical reaction reactant(s) 3 in charge mode, are further stored as a chemical reaction reactant in a solid form and/or liquid form (10), and preferably the stored chemical reaction reactant is selected from the group of: metals, oxides, carbonates, nitrates, nitrites, nitrides, phosphates, phosphites, phosphides, sulfates, sulfites, sulfides, hydroxides, hydrides, halogens, and any combinations thereof, more preferably is: iron, iron oxide, sodium oxide, sodium peroxide, barium oxide, barium peroxide, carbon, sulfur, and most preferably is iron oxide.

Thus, it is further advantageous that the gaseous electrochemical reaction products have certain compositions, and further that at least one of the gaseous electrochemical reaction products is stored as a chemical reaction product of a certain composition.

In an embodiment of the disclosure, the gaseous electrochemical reaction product(s) 4 in charge mode are selected from the group of: carbon monoxide (CO), oxygen ($O_2$), hydrogen ($H_2$), sulfur compounds, such as $S_2O$ and SX, where SX can be $S_2$, $S_3$, $S_4$, $S_5$, $S_6$ etc., and any combinations thereof. In a further embodiment, the at least one gaseous electrochemical reaction product 4 in charge mode is stored as a chemical reaction product in a solid form and/or liquid form 11, and preferably is selected from the group of: metals, oxides, carbonates, nitrates, nitrites, nitrides, phosphates, phosphites, phosphides, sulfates, sulfites, sulfides, hydroxides, hydrides, halogens, carbon, sulfur, and any combinations thereof, more preferably is: iron, iron oxide, sodium oxide, sodium peroxide, barium oxide, barium peroxide, carbon, sulfur, and most preferably is solid carbon, solid iron, solid sodium peroxide, liquid sodium peroxide.

Further advantageously, the battery chemistry is based on certain compositions of the gaseous electrochemical reaction reactant, the gaseous electrochemical reaction product, stored chemical reaction product, and/or the stored chemical reaction reactant.

In an embodiment of the disclosure, the gaseous electrochemical reaction reactant 3 in charge mode comprises carbon dioxide ($CO_2$), the gaseous electrochemical reaction product(s) 4 comprises carbon monoxide (CO) and oxygen ($O_2$), and the stored chemical reaction product 11 comprises solid carbon (C). In a further embodiment, the gaseous electrochemical reaction reactants 3 in charge mode comprise carbon dioxide ($CO_2$) and water vapor ($H_2O$), the gaseous electrochemical reaction product(s) 4 comprises hydrogen ($H_2$) and oxygen ($O_2$), and the stored chemical reaction product 11 comprises solid carbon (C).

In another embodiment, at least part of the gaseous electrochemical reaction reactants 3 stored as a chemical reaction reactant is stored as iron oxide in charge mode. In a further embodiment, at least part of the gaseous electrochemical reaction product stored as a chemical reaction product 11 is stored as sodium peroxide.

In another embodiment, the stored chemical reaction product is in a gaseous form, and preferably is gaseous methane ($CH_4$). In a further embodiment, the gaseous electrochemical reaction reactants 3 in charge mode comprises water vapor ($H_2$) and carbon dioxide ($CO_2$), the gaseous electrochemical reaction product(s) 4 comprises hydrogen ($H_2$), carbon monoxide (CO) and oxygen ($O_2$), and the stored chemical reaction product 7 comprises methane ($CH_4$).

The composition of the gaseous electrochemical reactants and products may further be exemplified for the carbon-oxygen passive flow battery. For example it may be advantageous to include a small amount of gaseous $H_2/H_2O$ in the $CO/CO_2$ mixture.

Including small amounts of $H_2/H_2O$ may change the reaction pathway without changing the net reaction. The reasons for doing this are that (i) the electrochemical $H_2O$ reduction reaction has faster reaction kinetics than $CO_2$ reduction to CO, and (ii) the thermochemical carbon deposition reactions can also be affected in a beneficial way by the presence of $H_2$ and $H_2O$ by modifying the reaction pathway. For example, the presence of $H_2$ is known to affect the morphology and growth rates of carbon nanofibers. The charging reaction would then be able to proceed as in the following three-step reactions, with only e.g. 1% of $H_2/H_2O$ present and participating in the gas shuttle:

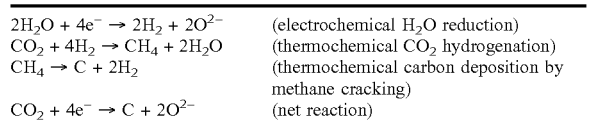

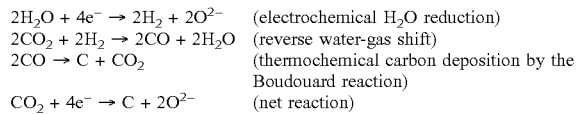

Additionally, in the case of the one-step charging reaction, the presence of $H_2/H_2O$ may also beneficially modify the electrochemical carbon deposition reaction rates and resulting carbon morphology.

Single Pressure Vessel

To improve the simplicity and compactness of the battery system, all of the battery system components are advantageously integrated with the storage arrangement into a single unit, such as a single vessel. Further advantageously, the single vessel is a single pressure vessel as exemplified in FIG. 6.

FIG. 6 shows an embodiment of the flow battery system according to the present disclosure during charge mode, where electrical energy is stored by converting $CO_2$ to carbon and oxygen, and a single pressure vessel contains all of the battery components.

FIGS. 7 and 9 are zoomed-in views of the right-side of FIG. 6, showing the simplicity of the passive flow battery, with zero or minimal balance-of-system components needed for the operation as either flow battery (FIG. 7) or reversible fuel cell (FIG. 9). External to the battery, the system further advantageously comprises power electronics and/or a coolant flow around the pressure vessel (not shown).

FIG. 7 shows a detailed view of the embodiment shown in FIG. 6. In the embodiment of FIG. 7, the cells are tubular in geometry, and carbon (as the solid chemical reaction product 11) is formed adjacent to the cells. The flow battery system further comprises a $CO_2$ membrane between the $CO_2$ storage arrangement and the cell. Tubular cells may provide the advantage of easier and better sealing, i.e. lower gas leakage, and thereby increased efficiency of the system.

Open Vessel

A reversible fuel cell that is operated as a closed system may be considered as a type of flow battery. Thus, the passive flow battery system of the present disclosure is also suitable for working as a reversible fuel cell.

The tanks or storage arrangement of the present disclosure may also be open for continuous flow to an external source or storage, i.e. corresponding to a flow battery with infinite capacity, while operating as a generator. This may be obtained by connecting the system to a second fluid communication system supplying the continuous flow, via two or more valves.

If all the valves are switched from closed to open, the system will operate as a generator. If all the valves are closed, the system will operate as a passive flow battery.

In an embodiment of the disclosure, the system further comprises a second fluid communication system 18 between the closed battery system and an external reactant(s) supply and/or an external product(s) effluent, such as an external fuel supply.

This means that in addition to operating as a battery with electricity in and electricity out, the novel battery can be supplied with fuel such as methane, propane, or hydrogen and produce electricity, operating as a generator.

This will increase the versatility of the passive flow battery. For a conventional rechargeable battery system, the battery may be used in a household for solar electricity storage, and the household would further need to have a generator for the periods that are not sunny enough to keep the batteries sufficiently charged. For the passive flow battery with hybrid operation modes, the household could have a tank of propane on standby; and instead of a battery and a generator (e.g. internal combustion engine or fuel cell), the passive flow battery system can serve both functions, greatly simplifying the system. Similarly, in a plug-in hybrid electric vehicle (PHEV) there would not be a need for an additional engine or fuel cell, since the passive flow battery system can itself function as a range extender.

FIG. 9 shows an embodiment of a battery system operating as a generator. The system comprises a second fluid communication system 18 providing respectively air to the stack of positive electrodes, and hydrocarbon fuel to the stack of negative electrodes, from an external source to provide electrical power.

The stack of cells in FIG. 9 is exemplified as planar in geometry, however the tubular cell stack geometry of FIG. 7 may also be applied. A further zoomed-in view of the stack is shown in FIG. 8, showing the planar cell, and carbon is formed in the flow channels of the cell stack.

Applications

The battery system of the present disclosure may be used in several operation modes. Throughout most of the description, the battery system has been described for the charging mode. It is implicit that the battery system may be operated in discharging mode, when the current to the system is reversed.

In addition to being operated as a passive flow battery, the battery system of the present disclosure may be operated as a reversible fuel cell or a generator.

EXAMPLES

The invention is further described by the examples provided below.

Example 1—Carbon-Oxygen Flow Battery

Example 1 describes a flow battery system with storage arrangements comprising oxygen gas, a gas mixture of carbon dioxide and carbon monoxide, and solid carbon, wherein carbon monoxide is an intermediate electrochemical reaction product.

The passive flow battery system 1 stores a gas mixture of 93% $CO_2$ and 7% CO 6 at 200 bar when fully discharged, where the percentage concentrations correspond to mole fractions. In FIG. 3 and FIG. 6, this gas mixture is simply labelled "$CO_2$".

During charge mode, solid carbon 11 and oxygen 7 are produced and stored. The solid carbon 11 is stored at 700° C. in the hot zone together with the cell stack 2, whereas the oxygen 7 and $CO_2$/CO mixture 6 are stored at 34° C. As shown in FIG. 2A and FIG. 3, charging the battery drives a two-step reaction, where CO is first produced by $CO_2$ electrolysis and then carbon is deposited from CO by the Boudouard reaction. First, the $CO_2$/CO mixture 6 flows via a first fluid communication system 12 to the negative electrode 14 of the cells 2. $CO_2$, the electrochemical reaction reactant 3, is electrolyzed at the negative electrode 14 to yield CO and oxygen ions, which are transported across the electrolyte 13 to the positive electrode 15 to form $O_2$ gas. The gaseous electrochemical reaction products 4 are therefore CO and $O_2$.

The negative-electrode 14 is comprised of a mixed ionic-electronic conductor 20 material that carries out $CO_2$ electrolysis to CO with a CO product concentration that is higher than the thermodynamic equilibrium of the Boudouard reaction. Using nickel based electrodes in this operating regime was found to lead to carbon deposition and severe degradation of the electrodes. However, with electrode surfaces comprised of acceptor-doped ceria, e.g. 10 mol-% Gd-doped $CeO_2$, destructive carbon deposition was avoided. The CO product diffuses away from the negative-electrode 14 to a storage arrangement 5 where solid carbon 11 is deposited on nickel nanoparticle catalysts 21 via the Boudouard reaction, returning the gas composition to the equilibrium 93% $CO_2$ and 7% CO. The carbon nanofibers or multi-walled carbon nanotubes may be ideally deposited by the base-growth mechanism where the catalyst particle remains strongly adhered to the catalyst support material 22, as shown in FIG. 3. Catalysts designed for tip-growth mode, where the catalyst nanoparticle is lifted off the substrate, were also found to be effective for operation of the battery. Furthermore, molten salt additives, such as alkali metal carbonates, are mixed with the catalysts to achieve improved battery cyclability by facilitating highly reversible carbon deposition.

The combination of electrochemical and chemical reactions generates pressure and concentration differences in the gasses and thereby induces an automatic gas flow between the storage arrangements 5 and cells 2 via the first fluid communication systems 12 during charging and discharging.

The oxygen and the $CO_2$/CO mixture are stored in two adjacent gas compartments 8 separated by a moveable barrier 9, as shown in FIG. 2A, FIG. 3, and FIG. 6. As oxygen is produced at the positive electrode 15, the resulting pressure increase causes the moveable barrier 9 to move to balance the pressure, which pushes the $CO_2$/CO gas on the other side of the barrier towards the negative-electrode 14.

At the same time, solid carbon is produced from $CO_2$ gas on the negative-electrode side of the cell, and the resulting pressure decrease causes the moveable barrier 9 to move in the same direction. In FIG. 3 and FIG. 6, the moveable barrier is a balloon or bladder. Storage with a single pressure vessel is therefore possible, and a constant pressure and volume is maintained during charging and discharging.

The components of the battery are also arranged to provide heat balancing between the electrochemical and thermochemical reactions within the hot zone as well as heat management between the hot zone and cold zone.

Carbon deposition by the Boudouard reaction is exothermic. The heat produced (Q) is transported to the cell 2 where it is absorbed by the endothermic $CO_2$ electrolysis reaction. The $CO_2$ electrolysis reaction to produce CO is endothermic when the applied cell voltage is below the thermoneutral voltage, 1.46 V, and the passive flow battery system according to the present disclosure is nominally charged at 1.08 V per cell. Open-circuit cell voltage is 1.027 V and nominal discharge voltage is 0.97 V per cell. The net reaction is therefore slightly exothermic in charge mode, as well as in discharge mode.

In FIG. 3, the heat (Q) is absorbed at the positive electrode (15) because the positive electrode reaction during charge mode is strongly endothermic. However, since the 2 electrodes are separated by a solid oxide electrolyte with thickness of typically only 10-100 microns, the heat transfer to both electrodes is fast. To manage and maintain the 700° C. operating temperature in the hot zone, which comprises the cell stack 2 and the solid carbon storage arrangement 11, 5, while keeping the rest of the system at 34° C., insulation 19 is included as well as temperature-regulating heat transfer means 17, in the form of a heat exchanger that heats cold $CO_2$ flowing towards the cell with hot $O_2$ flowing away from the cell during charge mode, and in the form of heat pipes that provide passive cooling of the battery when excess heat is produced, as shown in FIG. 6.

The heat pipes are comprised of molten potassium metal encased in steel and with a steel wick. Potassium has a boiling point of 759° C. and vapor pressure of approximately 0.6 bar at 700° C. Although only three heat pipes are shown in FIG. 6, more heat pipes can be dispersed throughout the insulation as needed to provide sufficient heat removal from the cell stack, and the heat pipes can extend into regions of the stack. The assembly of heat pipes in the insulation effectively provides adjustable insulation so that minimal heat leaves the battery when it is in idle mode but heat is removed at sufficient rates when it is generating heat during charging and discharging. A heater 23 is included to heat up the battery at the start of operation and to maintain temperature when the battery is in idle mode.

FIG. 6 shows an embodiment of the passive flow battery system) where all components are arranged inside a single pressure vessel, illustrating the lack of needed balance-of-system components compared with flow batteries and reversible fuel cells. The only connections needed to feed through the pressure vessel walls are the positive and negative electrical terminals. The outer walls of the pressure vessel are in contact with a heat transfer fluid that acts as a coolant, as is often used in conventional battery systems. On the hot end that contains the cell stack 2, the outer wall of the pressure vessel has heat transfer fins which are not shown in the figure.

Example 2—Carbon-Oxygen Flow Battery Comprising a CO₂ Separation Membrane

The flow battery system is as in Example 1, and in addition the cells are tubular in geometry and a $CO_2$ separation membrane 16 is included between the $CO_2$ storage arrangement and the cells.

FIG. 7 shows a detailed view of a passive flow battery system 1 similar to the one shown in FIG. 6, wherein the stored reactant gas 6 for charge mode is 100% $CO_2$ rather than the gas mixture of 93% $CO_2$ and 7% CO described in Example 1. Storage of pure $CO_2$ is accomplished by including a $CO_2$ separation membrane 16 that selectively permeates $CO_2$ and thereby contains the $CO_2$/CO gas mixture only within the insulated hot zone where the electrochemical and thermochemical reactions are occurring. Note that in FIG. 6 it is implied that an electronic conducting component is included in the same region as the membrane 16, to carry electrical current to and from the cells.

The cells 2 are closed-end tubes instead of the planar geometry shown in FIGS. 8 and 9. The tubular geometry simplifies and minimizes sealing between the $CO_2$ and $O_2$ sides of the cells. High quality sealing provides low leak rates and corresponding low battery self-discharge rates. The solid carbon storage arrangement 11, 5 is located in a separate region of the hot zone, adjacent to the cells, and the carbon is deposited as a forest of vertically aligned carbon nanotubes. This storage arrangement minimizes the amount of material needed to hold the carbon compared with including it within the cell stack repeating units, as shown in FIGS. 8 and 9.

The $CO_2$ membrane 16 also enables inclusion of a small amount of gaseous $H_2O/H_2$ in the $CO_2$/CO mixture in the sealed hot zone, which changes the reaction pathway without changing the net reaction. One advantage of these additional gaseous intermediates, such as $H_2$, $H_2O$ and possibly $CH_4$ depending on the conditions, is that the electrochemical $H_2O$ reduction reaction has faster reaction kinetics than $CO_2$ reduction to CO. The thermochemical carbon deposition reactions are also affected in a beneficial way by the presence of $H_2$ and $H_2O$ by modifying the reaction pathway. The presence of $H_2$ also affects the morphology and growth rates of carbon nanofibers. The net charging reaction on the negative-electrode side would then be able to proceed as in the following three-step reactions, with only e.g. 1% of $H_2O/H_2$ present and participating in the gas shuttle:

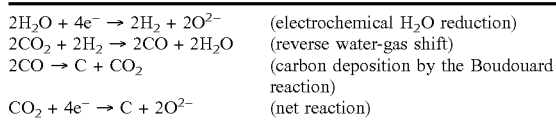

| | |
|---|---|
| $2H_2O + 4e^- \rightarrow 2H_2 + 2O^{2-}$ | (electrochemical $H_2O$ reduction) |
| $2CO_2 + 2H_2 \rightarrow 2CO + 2H_2O$ | (reverse water-gas shift) |
| $2CO \rightarrow C + CO_2$ | (carbon deposition by the Boudouard reaction) |
| $CO_2 + 4e^- \rightarrow C + 2O^{2-}$ | (net reaction) |

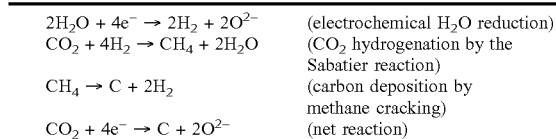

| | |
|---|---|
| $2H_2O + 4e^- \rightarrow 2H_2 + 2O^{2-}$ | (electrochemical $H_2O$ reduction) |
| $CO_2 + 4H_2 \rightarrow CH_4 + 2H_2O$ | ($CO_2$ hydrogenation by the Sabatier reaction) |
| $CH_4 \rightarrow C + 2H_2$ | (carbon deposition by methane cracking) |
| $CO_2 + 4e^- \rightarrow C + 2O^{2-}$ | (net reaction) |

Example 3—Carbon-Oxygen Flow Battery Comprising Hot and Cold Zones

The flow battery system is as in Examples 1 or 2, and further comprises separate, connected vessels which are used for the hot and cold zones.

The flow battery system is configured similarly to the one shown in FIG. 6, but where the hot zone is in one vessel and the cold zone for storage of the gases is in a second vessel and the two are connected by piping, wherein a nearly constant, equal pressure is still maintained in both vessels and throughout the system.

In another embodiment, the separate cold vessel for storage of gases is an underground gas cavern filled with $CO_2$ that contains a secondary compartment for storing the $O_2$. The battery system uses the configuration described in Example 2 and FIG. 7 which comprises a $CO_2$ separation membrane, so that the cavern contains only $CO_2$ without any CO.

Example 4—Sulfur-Oxygen Flow Battery

This embodiment describes a flow battery system with storage arrangements comprising oxygen gas, a gas mixture of sulfur dioxide and other sulfur species, and liquid sulfur.

The passive flow battery system 1 stores a gas mixture 6 of mainly sulfur dioxide, with disulfur monoxide and other sulfur species as minor components, when fully discharged.

The net charge mode reaction is $SO_2 \rightarrow S+O_2$, which is analogous to the carbon-based chemistry, $CO_2 \rightarrow C+O_2$, described in Examples 1 and 2 and uses the same storage arrangement shown in FIG. 2A.

One important difference from the solid carbon based chemistry is that the sulfur charge-mode product 11 is stored in molten state in the 700° C. hot zone. Another difference is that the net charge reaction is mildly endothermic, whereupon heat is supplied by the integrated heater 23 or heat storage component that provides temperature-regulating heat transfer means 17. The nearly constant gas pressure of the system is 200 bar. The battery is charged and discharged in the range 0.7-0.9 V per cell.

Example 5—Iron-Oxygen Flow Battery

Example 5 describes a flow battery system with storage arrangements comprising oxygen gas and a solid mixture of iron and iron oxide, wherein hydrogen and steam are intermediate electrochemical reaction products.

The flow battery system 1 is configured with the storage arrangements shown in FIG. 2B and FIG. 4 during charge mode, wherein electrical energy is stored by converting FeO 10 to Fe 11 and $O_2$ 7.

The Fe is formed by a two-step reaction, where $H_2$ and $O_2$ are the electrochemical reaction products 4 first produced by electrolysis of $H_2O$ 3 and then Fe is formed by chemical reduction of FeO with $H_2$, which restores the $H_2O$.

The FeO and Fe are a single bed of mixed material which also comprises molten salt additives, such as alkali metal carbonates and molten iron chloride, that achieve improved battery cyclability by facilitating highly reversible conversion between FeO and Fe.

The $H_2$ and $H_2O$ comprise a shuttle gas that is continuously cycled in the negative-electrode chamber and maintains a composition close to 71% $H_2$ and 29% $H_2O$ at 700° C., which is in equilibrium above the Fe/FeO. This shuttle gas is part of the first fluid communication system 12, and the other part is the path for the $O_2$ product on the other side of the cell to flow to its storage compartment 7. This means that air flowing means are not necessary, and the $O_2$ tank (i.e. the pressurized $O_2$ tank) enables the oxygen flow.

The combination of electrochemical and chemical reactions generates pressure and concentration differences in the gasses and thereby induces an automatic gas flow between the storage arrangements 5 and cells 2 during charging and discharging.

This iron-based battery is arranged inside a single pressure vessel, similar to the one shown in FIG. 6 for the carbon-based battery. Unlike the carbon-based battery in Examples 1 and 2 which stores two gases and include a moveable barrier 9 for pressure balancing, in this battery only a single gas is stored, $O_2$, and its pressure varies with state of charge, from low to high during charging. This means there will be different pressures on the positive ($O_2$) and negative (small quantity of $H_2/H_2O$ shuttle gas) sides of the cell. Open-circuit voltage is on average 1.1 V per cell.

This battery also differs from Examples 1 and 2 in that it is strongly endothermic during charge mode at a 1.16 V operating point. Therefore, the electrochemical cell 2 is integrated in thermal communication with a high-temperature PCM 17, which provides heat to the cell during charge mode and stores heat during exothermic discharging at 1.04 V, improving roundtrip energy storage efficiency. This heat storage component is also useful in all other embodiments of the invention, including those like Example 1 that are not endothermic in either charge or discharge mode, because in all cases it stores waste heat and then passively keeps the system hot during idle periods, without consuming valuable electrochemically-stored energy. The PCM is $MgCl_2$, which has a melting point of 712° C. and a low cost of about $1 per kWh thermal energy stored. Due to the low thermal conductivity of $MgCl_2$, the PCM container provides a number of heat transfer paths through the PCM. Heat pipes 17 are also included to remove excess heat from the system during discharge mode.

Example 6—Iron-Sodium-Oxygen Flow Battery

The embodiment describes a flow battery system with storage arrangements comprising a mixture of Fe and FeO and a mixture of $Na_2O$ and $Na_2O_2$, wherein hydrogen, steam and oxygen are intermediate electrochemical reaction products.

The flow battery system 1 is configured with the storage arrangements shown in FIG. 2C and FIG. 5 during charge mode, wherein electrical energy is stored by converting stored chemical reaction reactants 10 FeO and $Na_2O$ to stored chemical reaction products 11 Fe and $Na_2O_2$.

In the storage arrangement in the negative electrode chamber 5, Fe is formed by a two step reaction as in Example 5 and FIG. 4. In the storage arrangement in the positive electrode chamber 5, $Na_2O_2$ is formed by a two step reaction by electrochemical production of $O_2$ 4 followed by oxidation of $Na_2O$ to $Na_2O_2$.

The equilibrium $O_2$ above the $Na_2O/Na_2O_2$ mixture is approximately 3% at the 700° C. operating temperature, so the shuttle gas in the positive electrode chamber is a mixture of 3% $O_2$ and 97% $N_2$ or argon at 1 bar. The cell stack 2, the $H_2/H_2O$ and $O_2/N_2$ shuttle gases 12, and the Fe/FeO and $Na_2O/Na_2O_2$ storage arrangements 5 are all in the 700° C. hot zone at the same 1 bar pressure. The $Na_2O_2$ is therefore in molten state. Unlike in the previous examples, no gases are stored.

At low overvoltages (<70 mV) in discharge mode the net reaction is mildly endothermic. When discharging at such low overvoltages, the needed heat is provided by the integrated heater 23 that is needed anyway for initial heat-up, or by a small heat storage component 17 which, as mentioned in Example 5, is useful anyway as it passively keeps the system hot during idle periods without consuming valuable electrochemically-stored energy. The $Na_2O$ oxidation reaction occurring in the positive electrode storage arrangement 5 during charge mode is exothermic and part of the heat released (Q) is absorbed by the endothermic oxygen evolution reaction at the positive electrode 15. The battery is charged and discharged at 1.04 V and 0.94 V per cell, respectively.

Example 7—Methane-Oxygen Flow Battery

The embodiment describes a flow battery system with storage arrangements comprising oxygen gas, a gas mixture comprised mainly of methane, and a gas mixture comprised mainly of water vapor and carbon dioxide.

Figure 10:
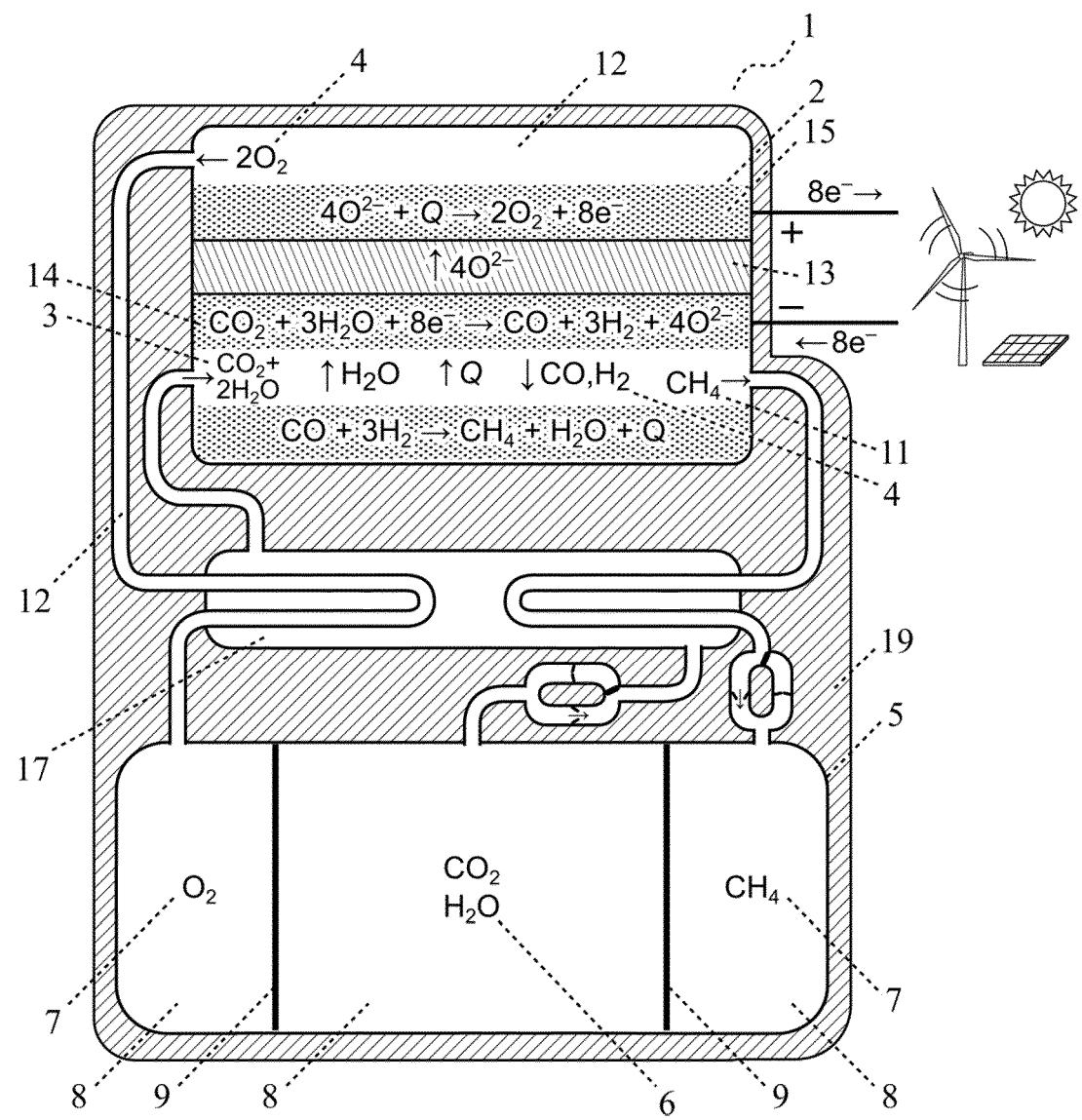

The flow battery system 1 is configured with the storage arrangement shown in FIG. 2D and FIG. 10 during charge mode, wherein electrical energy is stored by converting a stored gaseous reactant mixture 6 comprised mainly of water vapor and carbon dioxide to stored gaseous products 7 of oxygen and a methane-rich gas mixture.

In this system, the storage arrangement 5 comprises three compartments 8 to hold the stored gaseous reactant mixture 6 and the two stored gaseous products 7. The three compartments 8 are separated by two moveable barriers 9. The nearly constant gas pressure of the system is 30 bar. The hot zone, comprising the cell stack 2, is maintained at 550° C., while the remainder of the system is maintained at 250° C. to keep water in vapor phase, which is necessary for the battery to work as a passive flow system with stored gaseous reactants and products.

In charge mode, $H_2O$ and $CO_2$, the gaseous electrochemical reaction reactants 3, are electrolyzed at the negative electrode 14 to yield $H_2$, CO, and oxygen ions, the latter of which are transported across the electrolyte 13 to the positive electrode 15 to form $O_2$ gas. The gaseous electrochemical reaction products 4 are therefore $H_2$, CO, and $O_2$. The $H_2$ and CO thermochemically react on nickel-based catalysts in the negative electrode chambers in the cell stack to form methane. In some embodiments, the methane formation reaction occurs directly on the negative electrode.

The combination of electrochemical and chemical reactions generates pressure and concentration differences in the gasses and thereby induces an automatic gas flow between the storage arrangements 5 and cells 2 via the first fluid communication systems 12 during charging and discharging.

As oxygen is produced at the positive electrode 15, the resulting pressure increase causes the moveable barriers 9 to move to balance the pressure. As one molecule of methane is produced in the negative electrode 14 chamber from two molecules of $H_2O$ and one molecule of $CO_2$, the resulting pressure decrease causes the moveable barriers 9 to move in the same direction. In another and further embodiment, the system further comprises one or more one-way valve(s), also known as check valve(s). Examples of one-way valves, or check valves, are electronically controlled valves, where the one-way flow direction can be selected and switched. Thus, the one-way valve is either selected to allow one-way flow in a first direction, or to allow one-way flow in the opposite, i.e. second, direction. A system comprising a one-way valve in fluid communication with the $CO_2$—$H_2O$ reactants mixture compartment, and another one-way valve in fluid communication with the $CH_4$ product compartment is illustrated in FIG. 10. The one-way valves are exemplified as comprising a double-lumen tube, where the flow direction can be selected to flow within the first lumen in a first direction (shown with arrows), or the flow direction can be selected to flow within the second lumen in the opposite, second direction. When changing to charge mode or discharge mode, the electronically controlled valves are switched to select the gas pathways that contain check valves corresponding to the desired flow directions, which ensure the gases flow one-way in the desired directions.

The volume increases in the compartment that stores $O_2$ and the compartment that stores the mixture comprised mainly of methane, whereas the volume decreases in the compartment that stores the mixture comprised mainly of $H_2O$ and $CO_2$. Storage with a single pressure vessel is therefore possible, and a constant pressure and total volume is maintained during charging and discharging.

The battery is charged and discharged at 1.1 V and 1.0 V per cell, respectively, and is exothermic during both charging and discharging. As in the other examples, heat is managed by an integrated heater 23 and temperature-regulating heat transfer means 17.

In another and further embodiment, the gaseous electrochemical reactants and/or products are further converted, for example the $H_2O$ and $CO_2$ may be stored as liquid. This means that the system includes heat transfer means to vaporize these stored liquid reactants in charge mode when they are supplied from the compartments 8 of the storage arrangement 5 to the cell stack 2, and means to condense them when they are discharge mode products.

Example 8—Use of the System as a Reversible Fuel Cell

FIG. 9 shows a flow battery system 1 that normally operates as a passive flow system with the carbon-based chemistry described in Examples 1 and 2. The battery comprises a planar cell stack 2 with integrated storage arrangement for solid carbon 11, 5 as detailed in FIG. 8, instead of the tubular cell stack described in Example 2 and FIG. 7. Additionally, the battery has been adapted with a second fluid communication system 18 to allow flow in and out of external reactants and products.

In FIG. 9, the external reactants are a hydrocarbon fuel and air. After the battery has fully discharged its internal carbon and oxygen supplies, the valves are switched so that the $CO_2$ and $O_2$ storage compartments (8) are sealed off and the paths for external flows are opened, which is the state shown in FIG. 9. The external reactants are supplied and the battery continues to discharge and generate electrical power, temporarily operating as a fuel cell.

This enables the battery to serve a secondary function, replacing an internal combustion engine or dedicated fuel cell system that would be used only occasionally as a back-up generator or range extender for an electric vehicle. Similarly, at other times the battery is operated in charge mode as an electrolyzer with an external reactant supply of steam, producing external product streams of hydrogen and oxygen.

REFERENCE NUMBERS

1—rechargeable battery system
2—cell(s)/cell stack(s)
3—gaseous electrochemical reaction reactant(s)
4—gaseous electrochemical reaction product(s)
5—storage arrangement(s)
6—stored gaseous reactant(s)
7—stored gaseous product(s)
8—gas compartment(s)
9—moveable barrier(s)
10—solid or liquid chemical reaction reactant(s)
11—solid or liquid chemical reaction product(s)
12—first fluid communication system(s)
13—electrolyte
14—negative electrode
15—positive electrode
16—carbon dioxide separation membrane
17—temperature-regulating heat transfer means
18—second fluid communication system
19—insulation
20—mixed ionic-electronic conductor electrode
21—catalyst
22—support
23—heater
24—interconnect

REFERENCES

[1] WO 2014/044285
[2] WO/1996/023322
[3] U.S. Pat. No. 8,637,197

The invention claimed is:

1. A rechargeable battery system, comprising:
at least one electrochemical cell configured to in charge mode to convert one or more gaseous electrochemical reaction reactant(s) into one or more gaseous electrochemical reaction product(s),
at least one storage arrangement for storing said gaseous electrochemical reaction reactants and products,
wherein at least one of the gaseous electrochemical reaction product(s) is converted to and stored as at least one chemical reaction product(s),
where said chemical reaction product(s) has a lower gas pressure upon formation than the corresponding gaseous electrochemical reaction product(s),
a first fluid communication system between the at least one cell and the at least one storage arrangement,
wherein the first fluid communication system is configured to form a closed system within the battery system,
whereby the battery system is configured to generate an automatic gas flow between the at least one storage arrangement and cell.

2. The system according to claim 1, wherein the gaseous electrochemical reaction reactant(s) in charge mode are selected from the group of gaseous oxides including: carbon dioxide ($CO_2$), carbon monoxide (CO), water vapor, ($H_2O$), sulfur oxides ($SO_2$), and any combinations thereof.

3. The system according to claim 1, wherein at least one of the gaseous electrochemical reaction reactant(s) in charge mode is further stored as a chemical reaction reactant in a condensed phase, or wherein at least part of the gaseous electrochemical reaction reactants in charge mode is stored as iron oxide.

4. The system according to claim 1, wherein the gaseous electrochemical reaction product(s) in charge mode are selected from the group of: carbon monoxide (CO); oxygen ($O_2$); hydrogen ($H_2$); sulfur compounds $S_2O$, Sx, wherein Sx is $S_2$ or $S_3$ or $S_4$ or $S_5$ or $S_6$; and any combinations thereof.

5. The system according to claim 1, wherein the at least one gaseous electrochemical reaction product in charge mode is stored as a chemical reaction product in a solid form and/or liquid form, or wherein at least part of the gaseous electrochemical reaction product stored as a chemical reaction product is stored as sodium peroxide, or wherein the stored chemical reaction product is in a gaseous form.

6. The system according to claim 3, further comprising a holder for the stored chemical reaction reactant in a condensed phase or a holder for the stored chemical reaction product in a solid and/or liquid form.

7. The system according to claim 1, wherein the at least one storage arrangement further comprises one or more liquid media, selected from the group of: molten salts, molten metals, and liquid additives, or wherein the at least one storage arrangement is integrated within the repeating units of a cell stack.

8. The system according to claim 1, wherein the gaseous electrochemical reaction reactant in charge mode comprises carbon dioxide ($CO_2$), the gaseous electrochemical reaction products comprise carbon monoxide (CO) and oxygen ($O_2$), and the stored chemical reaction product comprises solid carbon (C), or wherein the gaseous electrochemical reaction reactants in charge mode comprise carbon dioxide ($CO_2$) and water vapor ($H_2O$), the gaseous electrochemical reaction products comprise hydrogen ($H_2$) and oxygen ($O_2$), and the stored chemical reaction product comprises solid carbon (C), or wherein the gaseous electrochemical reaction reactants in charge mode comprise water vapor ($H_2O$) and carbon dioxide ($CO_2$), the gaseous electrochemical reaction products comprise hydrogen ($H_2$), carbon monoxide (CO) and oxygen ($O_2$), and the stored chemical reaction product comprises methane ($CH_4$).

9. The system according to claim 1, wherein the at least one storage arrangement(s) comprises gaseous reactants and/or products that are fully or partially in the supercritical fluid state.

10. The system according to claim 1, wherein the at least one storage arrangement comprises multiple gas compartments, and wherein the multiple gas compartments are configured to be pressure balanced.

11. The system according to claim 10, wherein the multiple gas compartments are separated by one or more moveable barriers(s), adapted such that the battery system is configured to maintain an essentially equal pressure in the multiple gas compartments.

12. The system according to claim 11, wherein the moveable barrier(s) are selected from the group of: a moveable piston, an inflatable balloon or bladder, or any combinations thereof.

13. The system according to claim 1, configured to operate without pressure balancing means, and/or flow control means.

14. The system according to claim 1, wherein the electrochemical cell comprises an electrolyte selected from the group of: solid oxide oxygen ion conductors, molten metal carbonates, molten hydroxides, solid oxide proton conductors.

15. The system according to claim 1, configured to an operating pressure between 0.1-500 bar, or configured to an operating temperature between 400-1000° C.

16. The system according to claim 1, further comprising a carbon dioxide separation membrane for separating carbon dioxide from a gas mixture.

17. The system according to claim 1, further comprising one or more passive, temperature-regulating heat transfer means, and/or a heat pipe subsystem for transferring heat generated inside the system to the outside, or further comprising a second fluid communication system between the closed battery system and an external reactant(s) supply and/or an external product(s) effluent.

18. A method for charging a rechargeable battery, comprising the steps of:
providing the battery system according to claim 1,
providing an external electric current, optionally from a renewable power source such as wind, water, and/or solar,
whereby the current is electrochemically converted to stored chemical energy within the battery.

19. A method for discharging a rechargeable battery, comprising the steps of:
providing the battery system according to claim 1,
electrically connecting the battery system to an external electric circuit,
whereby the chemical energy in the stored products of the battery system is electrochemically converted to an electric current.

20. A method for discharging a rechargeable battery, comprising the steps of:
providing the battery system according to claim 17,
supplying the system with a flow of fuel reactant(s), selected from the group of: hydrocarbons, alcohols, hydrogen, ammonia, and any combinations thereof,
whereby the chemical energy in the fuel is electrochemically converted to an electric current.

* * * * *